(12) United States Patent
Wen et al.

(10) Patent No.: US 10,264,287 B2
(45) Date of Patent: Apr. 16, 2019

(54) INVERSE LUMA/CHROMA MAPPINGS WITH HISTOGRAM TRANSFER AND APPROXIMATION

(71) Applicant: Dolby Laboratories Licensing Corporation, San Francisco, CA (US)

(72) Inventors: Bihan Wen, Urbana, IL (US); Harshad Kadu, Santa Clara, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 8 days.

(21) Appl. No.: 15/725,101

(22) Filed: Oct. 4, 2017

(65) Prior Publication Data

US 2018/0098094 A1    Apr. 5, 2018

Related U.S. Application Data

(60) Provisional application No. 62/404,307, filed on Oct. 5, 2016.

(51) Int. Cl.
*H04N 19/70*    (2014.01)
*H04N 19/12*    (2014.01)
(Continued)

(52) U.S. Cl.
CPC ........... *H04N 19/70* (2014.11); *H04N 19/102* (2014.11); *H04N 19/12* (2014.11); *H04N 19/136* (2014.11);
(Continued)

(58) Field of Classification Search
CPC ...... H04N 19/70; H04N 19/46; H04N 19/102; H04N 19/186; H04N 19/136; H04N 19/533; H04N 19/12; H04N 19/40
See application file for complete search history.

(56) References Cited

U.S. PATENT DOCUMENTS 8,811,490 B2 *   8/2014   Su ...................... H04N 19/105
                                                375/240.16
9,264,681 B2 *   2/2016   Gish ...................... G09G 5/02
(Continued)

FOREIGN PATENT DOCUMENTS

| WO | 2013/112532 | 8/2013 |
| WO | 2016/153896 | 9/2016 |
| WO | 2017/165494 | 9/2017 |

OTHER PUBLICATIONS

ITU-R BT.1886 "Reference Electro-Optical Transfer Function for Flat Panel Displays used in HDTV Studio Production", Mar. 2011, pp. 1-11.

(Continued)

*Primary Examiner* — Joseph Suh

(57) ABSTRACT

An SDR CDF is constructed based on an SDR histogram generated from a distribution of SDR codewords in SDR images. An HDR CDF is constructed based on an HDR histogram generated from a distribution of HDR codewords in HDR images that correspond to the SDR images. A histogram transfer function is generated based on the SDR CDF and the HDR CDF. The SDR images are transmitted along with backward reshaping metadata to recipient devices. The backward reshaping metadata is generated at least in part on the histogram transfer function.

20 Claims, 16 Drawing Sheets

(51) Int. Cl.
*H04N 19/136* (2014.01)
*H04N 19/533* (2014.01)
*H04N 19/186* (2014.01)
*H04N 19/46* (2014.01)
*H04N 19/102* (2014.01)
*H04N 19/40* (2014.01)

(52) U.S. Cl.
CPC .......... *H04N 19/186* (2014.11); *H04N 19/46* (2014.11); *H04N 19/533* (2014.11); *H04N 19/40* (2014.11)

(56) References Cited

U.S. PATENT DOCUMENTS

2010/0157078 A1* 6/2010 Atanassov .............. G06T 5/007
348/222.1
2013/0329778 A1* 12/2013 Su ........................ H04N 19/126
375/240.01

OTHER PUBLICATIONS

SMPTE Standard 2084:2014 "High Dynamic Range Electro-Optical Transfer Function of Mastering Reference Displays" pp. 1-14.

\* cited by examiner construct, based on backward reshaping metadata received with SDR images, a backward reshaping function 442 apply the backward reshaping function to the SDR images to generate predicted HDR images that approximate the target HDR images 444 cause the predicted HDR images to be rendered with a display device 446

FIG. 4C

INVERSE LUMA/CHROMA MAPPINGS WITH HISTOGRAM TRANSFER AND APPROXIMATION

TECHNOLOGY

The present invention relates generally to images. More particularly, an embodiment of the present invention relates to inverse luma/chroma mappings with cumulative-density-function (CDF)-based and/or multivariate-multi-regression (MMR)-based histogram transfer and approximation.

BACKGROUND

As used herein, the term "dynamic range" (DR) may relate to a capability of the human visual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr), where each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m$^2$ or nits. Most consumer HDTVs range from 300 to 500 nits with new models reaching 1000 nits (cd/m$^2$). Such displays thus typify a lower dynamic range (LDR), also referred to as a standard dynamic range (SDR), in relation to HDR or EDR. HDR content may be displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084: 2014 "High Dynamic Range EOTF of Mastering Reference Displays," which is incorporated herein by reference in its entirety. As appreciated by the inventors here, improved techniques for encoding and decoding video data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 4A through FIG. 4C illustrate example process flows; and

DESCRIPTION OF EXAMPLE EMBODIMENTS

Inverse luma/chroma mappings with CDF-based and/or MMR-based histogram transfer and approximation is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to encoding single-layer video data with inverse image mapping metadata. An SDR CDF is constructed based on an SDR histogram generated from a distribution of SDR codewords in one or more SDR images. An HDR CDF is constructed based on an HDR histogram generated from a distribution of HDR codewords in one or more HDR images that correspond to the one or more SDR images. A histogram transfer function is generated based on the SDR CDF and the HDR CDF. The one or more SDR images are transmitted along with backward reshaping metadata to one or more recipient devices. The backward reshaping metadata is generated at least in part on the histogram transfer function.

Additionally, optionally or alternatively, an SDR input vector is constructed over SDR codewords corresponding to non-empty histogram bins of an SDR histogram generated from a distribution of SDR codewords in one or more SDR images. An HDR input vector is constructed over HDR codewords in one or more target HDR images that correspond to the one or more SDR images. MMR coefficients are generated by minimizing a cost function constructed based on the SDR input vector and the HDR input vector. The one or more SDR images are transmitted along with backward reshaping metadata to one or more recipient devices. The backward reshaping metadata is generated at least in part on the MMR coefficients.

Example embodiments described herein relate to decoding single-layer video data with inverse image mapping metadata. Based on backward reshaping metadata received with one or more SDR images, a backward reshaping function is constructed. The backward reshaping function is represented by a histogram transfer function generated based on an SDR CDF and an HDR CDF. The SDR CDF is constructed based on an SDR histogram generated from a distribution of SDR codewords in the one or more SDR images. The HDR CDF is constructed based on an HDR histogram generated from a distribution of HDR codewords in one or more target HDR images that correspond to the one or more SDR images. The backward reshaping function is applied to the one or more SDR images to generate one or more predicted HDR images that approximate the target HDR images. The one or more predicted HDR images are caused to be rendered with a display device.

Example Video Delivery Processing Pipeline

Figure 1A:
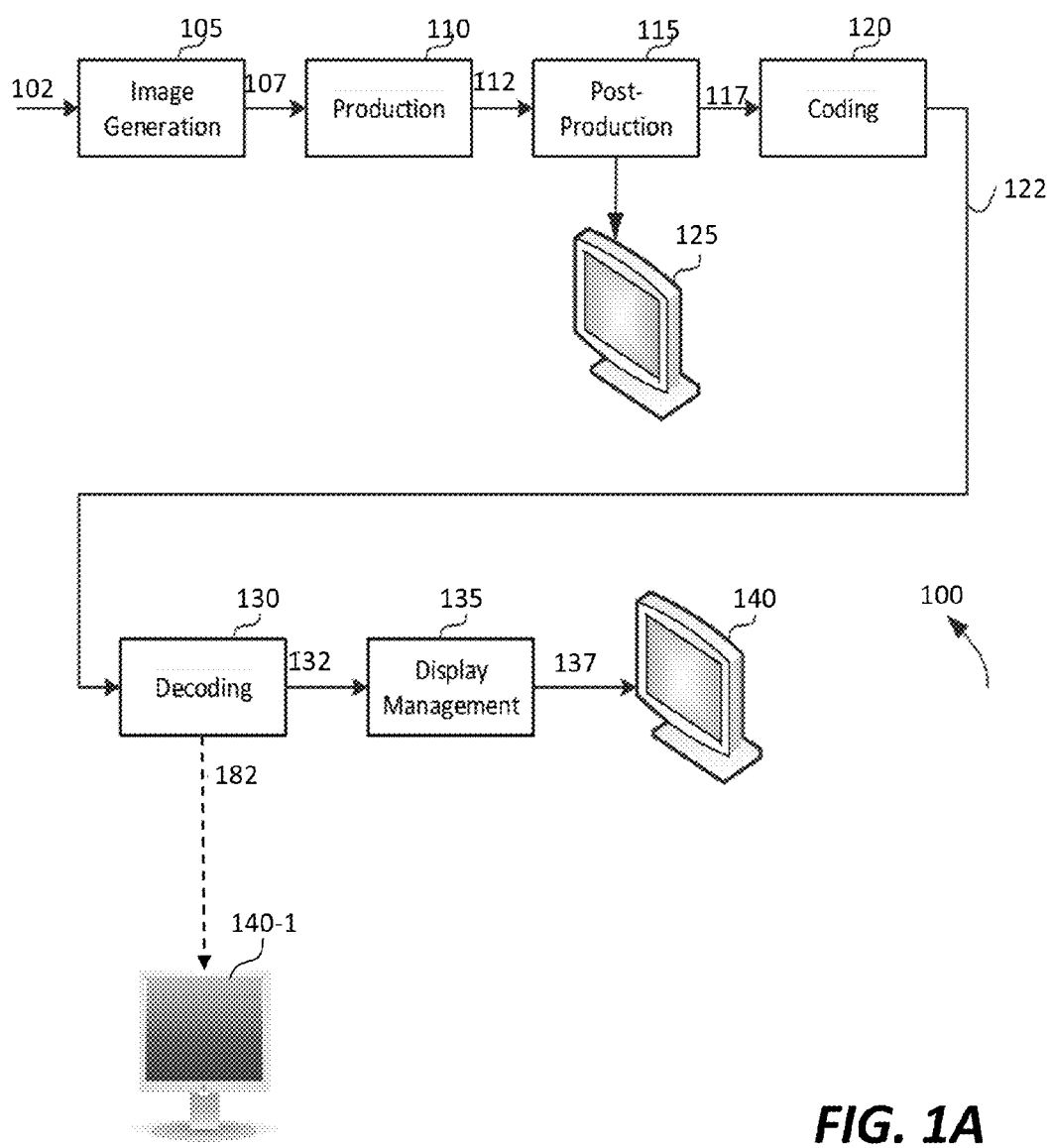
FIG. 1A depicts an example process of a video delivery pipeline.

FIG. 1A depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor for post-production editing (115). Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at post-production editing (115) to yield a release version of SDR (or relatively narrow dynamic range) images (117) (e.g., SDR, etc.). During post-production editing (115), the SDR images (117) are viewed on a reference display (125) that supports the standard dynamic range (or a relatively narrow dynamic range) by a colorist who is performing post-production editing operations on the SDR images (117).

Following post-production editing (115), the SDR images (117) are delivered to coding block (120) to be included in a code bit stream (122). The code bit stream (122) is to be delivered downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate the coded bit stream (122). In some embodiments, the coded bit stream (122) is encoded with the SDR images (117), preserve the artistic intent with which the SDR images (117) are generated in the post-production editing (115). The SDR images (117) may be encoded into video data in a video signal that is backward compatible with a wide variety of SDR display devices (e.g., SDR displays, etc.). In a non-limiting example, the video signal encoded with the SDR images (117) may be a single-layer backward compatible video signal.

Additionally, optionally, or alternatively, the coded bit stream (122) is further encoded with image metadata including but not limited to backward reshaping metadata that can be used by downstream decoders to perform backward reshaping on the SDR images (117) in order to generate backward reshaped images identical to or approximating target HDR images that may be optimized for rendering on HDR display devices.

In some embodiments, the target HDR images may be generated from the SDR images (117) using one or more SDR-to-HDR conversion tools implementing inverse tone mapping, inverse display management, etc.

In some embodiments, the target HDR images may be directly generated from the video data (112) at post-production editing (115). During post-production editing (115), the target HDR images are viewed on a second reference display (not shown) that supports the high dynamic range by the same or a different colorist who is performing post-production editing operations on the target HDR images.

In a receiver, the coded bit stream (122) is decoded by decoding block (130) to generate decoded images 182, which may be the same as the SDR images (117) subject to quantization errors generated in compression performed by the coding block (120) and decompression performed by the decoding block (130). In some embodiments, the receiver may be attached to a first target display (140-1). In scenarios in which the first target display (140-1) supports the standard dynamic range (or the relatively narrow dynamic range), the SDR images (117) edited with the artistic content as represented in the decoded images (182) are directly watchable on a first target display (140-1), which may be of similar characteristics as the reference display (125). In some embodiments, the receiver may be attached to a second target display (140), which supports the high dynamic range in which the HDR images are represented. In that case, the decoding block (130) may perform backward reshaping, based on the backward reshaping metadata received along with the SDR images (117), on the SDR images (117) into backward reshaped images (132) that represent an identical version or a close approximation of the target HDR images. Additionally, optionally, or alternatively, a display management block (135)—which may be in the receiver, in the target display (140), or in a separate device—further adjusts the backward reshaped images (132) to characteristics of the second target display (140) by generating display-mapped signal (137) adapted to the characteristics of the second target display (140).

Delivery of HDR Content and Backward Compatible SDR Content

In the past several decades, a great number of videos/movies have been created, stored, and/or published in the world. Almost all of these videos/movies are SDR content. An example of the SDR content may be, but is not necessarily limited to only, the SDR images (117) that are derived from the video data of production stream (112) of FIG. 1A, etc.

In some embodiments, the SDR content can be converted to production-quality or near-production-quality HDR content (that corresponds to the SDR content) efficiently with low costs, in order to take advantage of the popularity and ever-increasing deployment of HDR display technologies increases. For example, one or more relatively high quality SDR-to-HDR conversion tools such as those commercially available from Dolby Laboratories, Inc., San Francisco, can be used to convert the SDR images (117) that are derived from the video data of production stream (112) of FIG. 1A to generate the target HDR images as previously mentioned. In some embodiments, no clipping operations are performed as a part of generating the HDR content from the SDR images (117).

In some embodiments, the HDR content (that corresponds to the SDR content) can be derived from video data other than the SDR content; thus the conversion from the SDR content to the HDR content is not performed. For example, production-quality or near-production quality HDR content such as the target HDR images as previously mentioned can be derived directly from the video data of production stream (112) of FIG. 1A, rather than through a conversion from the SDR images (117) to the target HDR images. In some embodiments, one or more clipping operations may be performed as a part of generating the HDR content from the video data of production stream (112) of FIG. 1A.

Under other approaches, HDR content is delivered to downstream devices as compressed or uncompressed HDR video data. To consume the HDR video data, the downstream devices may need painful upgrades involving hardware or firmware upgrades to efficiently decode the received HDR video data. Such upgrades may be very difficult, or may not be feasible, with downstream devices that have already been deployed to end users. Furthermore, the decoding of the HDR video data under these other approaches may not be supported by a wide variety of downstream devices that only support rendering SDR content.

In contrast, under techniques as described herein described herein, production-quality or near-production-quality HDR content that corresponds to the SDR content does not have to be compressed/encoded and sent as HDR coded video data to downstream decoding devices. Instead, upstream encoding devices can use the HDR content as target HDR images, along with SDR images in the SDR content, to generate backward reshaping metadata, without actually compressing/encoding the target HDR images and delivering the compressed target HDR images to downstream decoding devices. The backward reshaping metadata generated by the upstream encoding devices can be sent with the SDR content to the downstream decoding devices in a video signal such as the coded bitstream (122), etc. The backward reshaping metadata in the video signal enables the downstream decoding devices to reconstruct the production-quality or near-production-quality HDR content from the SDR content in the same video signal. As a result, painful upgrades involving hardware or firmware upgrades to downstream decoding devices can be avoided under the techniques as described herein.

Furthermore, since the SDR content in the video signal can comprise the SDR images that are specifically optimized for SDR display devices, production-quality or near-production quality SDR content can be delivered to a wide variety of downstream decoding devices (including but not limited to those only capable of SDR rendering) at the same time.

Codec Architecture

Figure 1B:
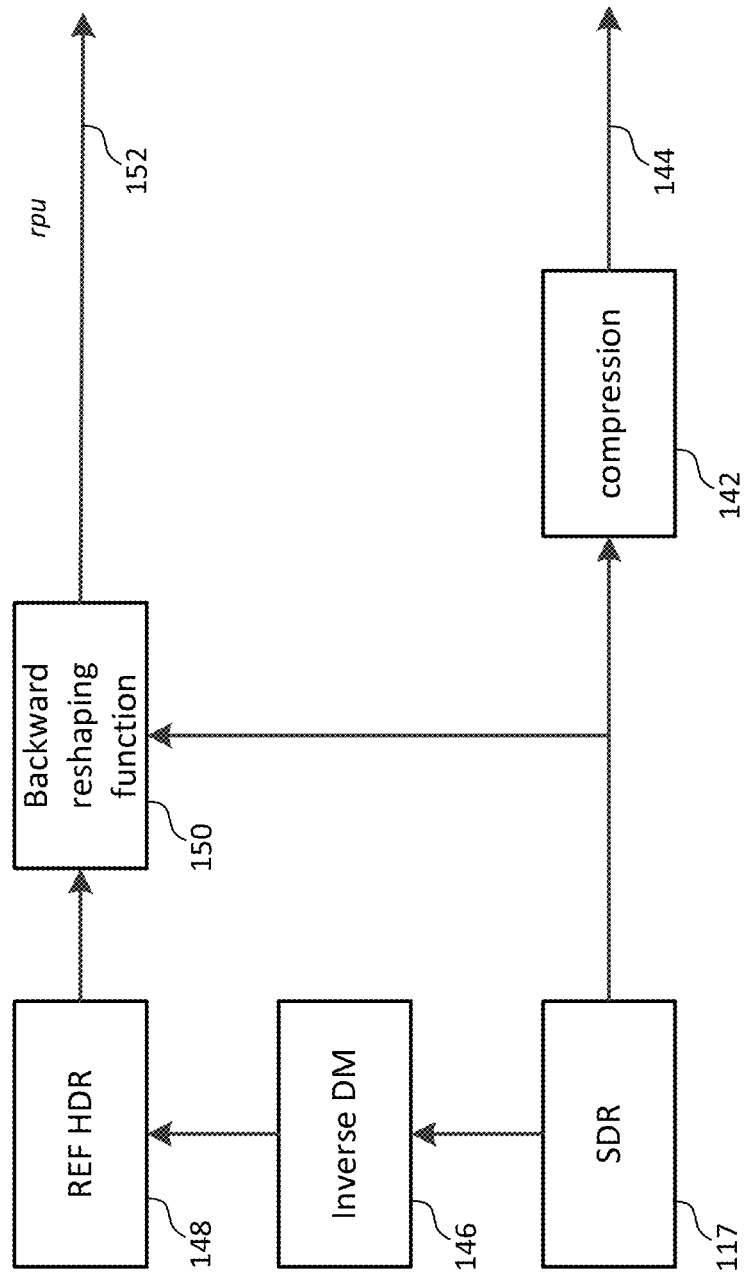
FIG. 1B and FIG. 1C illustrate an example single-layer inverse luma/chroma mapping codec framework.
Figure 1C:
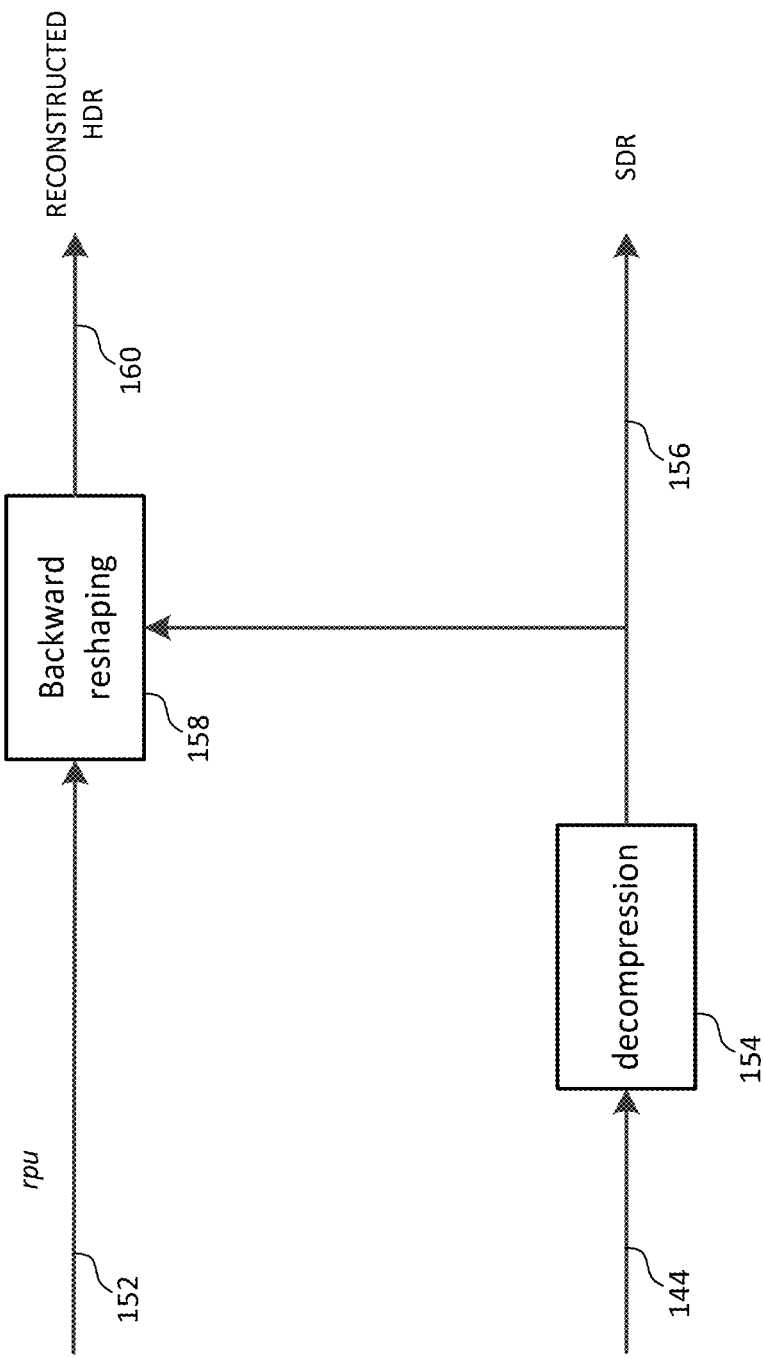

FIG. 1B and FIG. 1C illustrate an example single-layer inverse display management (SLiDM) codec framework. More specifically, FIG. 1B illustrates example encoder-side codec architecture, which may be implemented with one or more computing processors in an upstream video encoder, etc. FIG. 1C illustrates example decoder-side codec architecture, which may also be implemented with one or more computing processors in one or more downstream video decoders, etc.

Under the framework, SDR content is encoded and transmitted, in a single layer of a video signal such as the code bit stream (122), etc., by an upstream encoding device that implements the encoder-side codec architecture. The SDR content is received and decoded, in the single layer of the video signal, by a downstream decoding device that implements the decoder-side codec architecture. Backward reshaping metadata is also encoded and transmitted in the video signal with the SDR content so that HDR display devices can reconstruct HDR content based on the SDR content and the backward reshaping metadata.

In some embodiments, as illustrated in FIG. 1B, backward compatible SDR images such as the SDR images (117), etc., are received as input on the encoder side of the codec framework. Here, "backward compatible SDR images" may refer to SDR images that are specifically optimized or color graded for SDR displays.

A compression block 142 (e.g., a part of the coding block (122) of FIG. 1A, etc.) compresses/encodes the SDR images (117) in a single layer 144 of a video signal. An example video signal may be, but is not necessarily limited to only, the coded bitstream (122) of FIG. 1A.

By way of illustration but not limitation, an inverse dynamic-range mapping (DM) module 146—which may represent a SDR-to-HDR conversion tool, etc.—is used to convert the SDR images (117) to target HDR images 148. In some embodiments, the inverse-DM module may also be referred to as an inverse tone-mapping tool. As previously noted, in some embodiments, instead of converting the SDR images (117) to the target HDR images (148) may not be derived from the SDR images (117). For example, the target HDR images (148) may be derived from the same source/input video content used to derive the SDR images (117).

Regardless of whether the target HDR images (148) are derived from the SDR images (117) or not, a backward reshaping function generator 150 (e.g., a part of the coding block (122) receives both of the SDR images (117) and the target HDR images (148) as input, performs optimization to find out optimal backward reshaping functions such that backward reshaped images generated by backward reshaping the SDR images (117) with the optimal backward reshaping functions are as close to the target HDR images (148) as possible. The optimal backward reshaping functions may be represented or specified with backward reshaping metadata 152.

Examples of backward reshaping metadata representing/specifying the optimal backward reshaping functions may include, but are not necessarily limited to only, any of: inverse tone mapping function, inverse luma mapping functions, inverse chroma mapping functions, lookup tables (LUTs), polynomials, inverse DM coefficients/parameters, etc. In various embodiments, luma backward reshaping functions and chroma backward reshaping functions may be derived/optimized jointly or separately, may be derived using CDF histogram approximation/transfer techniques, may be derived using MMR histogram approximation/transfer techniques, etc.

The backward reshaping metadata (152), as generated by the backward reshaping function generator (150) based on the SDR images (117) and the target HDR images (148), may be encoded (e.g., by the coding block (122) of FIG. 1A, etc.) into the video signal.

In some embodiments, backward reshaping metadata (152) is carried in the video signal as a part of overall image metadata (denoted as "rpu"), which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (117) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation/transfer, MMR-based histogram approximation/transfer, etc.) available on the encoder side.

The encoder-side architecture of FIG. 1B can be used to avoid directly encoding the target HDR images (148) into coded/compressed HDR images in the video signal; instead, the backward reshaping metadata (152) in the video signal can be used to enable downstream decoding devices to backward reshape the SDR images (117) (which are encoded in the video signal) into reconstructed images that are identical to or closely/optimally approximate the target HDR images (148).

In some embodiments, as illustrated in FIG. 1C, the video signal encoded with the SDR images (117) in the single layer (144) and the backward reshaping metadata (152) as a part of the overall image metadata are received as input on the decoder side of the codec framework.

A decompression block 154 (e.g., a part of the decoding block (130) of FIG. 1A, etc.) decompresses/decodes compressed video data in the single layer (144) of the video signal into the decoded SDR images (182). The decoded SDR images (182) may be the same as the SDR images (117), subject to quantization errors in the compression block (142) and in the decompression block (154), which may have been optimized for SDR display devices. The decoded SDR images (182) may be outputted in an output SDR video signal 156 (e.g., over an HDMI interface, over a video link, etc.) to and rendered on an SDR display device.

In addition, a backward reshaping block 158 extracts the backward reshaping metadata (152) from the input video signal, constructs the optimal backward reshaping functions based on the backward reshaping metadata (152), and performs backward reshaping operations on the decoded SDR images (117) based on the optimal backward reshaping functions to generate the backward reshaped images (132) (or reconstructed HDR images). In some embodiments, the backward reshaped images represent production-quality or near-production-quality HDR images that are identical to or closely/optimally approximating the target HDR images (148). The backward reshaped images (132) may be outputted in an output HDR video signal 160 (e.g., over an HDMI interface, over a video link, etc.) to and rendered on an HDR display device.

In some embodiments, display management operations specific to the HDR display device may be performed on the backward reshaped images (132) as a part of HDR image rendering operations that render the backward reshaped images (132) on the HDR display device.

Histogram Transfer and Approximation

Under some approaches, an inverse mapping lookup table (LUT) may be built, for example, to inversely map pixel values of SDR images to pixel values of predicted HDR images in luma and/or chroma components (or channels). Each table entry in the inverse mapping LUT may contain a SDR value as a key and a predicted/mapped inverse mapping HDR value as a value, where the predicted/mapped inverse HDR value may be calculated as the average of all target HDR values in target HDR images corresponding to the SDR value in the SDR images.

Such an inverse mapping LUT—constructed from averaging HDR values in target HDR images for corresponding SDR values—may not be monotonically non-decreasing. As a result, the inverse of the (not monotonically non-decreasing) inverse mapping LUT may not be well-defined function (e.g., a single-valued function, etc.). Therefore, there may exist ambiguity as to whether any HDR values to which SDR values are to be mapped are actually optimal. The inverse mapping LUT may not properly represent backward reshaping that is conceptually an inverse of forward reshaping from the predicted HDR images (that are to approximate the target HDR images) to the SDR images. It may be difficult to expect the predicted HDR images based on such an inverse mapping LUT—constructed from averaging HDR values in target HDR images for corresponding SDR values—to confidently approximate the target HDR images with high visual qualities.

Under some other approaches, an optimization method that minimizes differences (or prediction errors) between predicted pixel values of predicted HDR images and target pixel values of target HDR images may be used to derive inverse mapping functions. However, while the prediction errors are minimized and the peak signal noise ratios are increased, the predicted HDR images may likely have different luma and/or chroma look from that of the target HDR images, as these approaches do not ensure similarities in luma and chroma distributions (e.g., histograms, etc.) between the predicted HDR images and target HDR images.

Techniques as described herein can be used to generate optimal backward reshaping functions (or optimal inverse luma and/or chroma mappings) that convert SDR images to predicted HDR images that have the same or similar luma and/or chroma looks of target HDR images. Instead of (e.g., merely) focusing on prediction errors and differences between predicted pixel values and reference pixel values as under other approaches that do not implement the techniques as described herein, the optimal backward reshaping functions generated with the techniques as described herein ensure that distributions (e.g., histograms, etc.) of luma and chroma pixel values of the predicted HDR images are similar to distributions of luma and chroma pixel values of the target HDR images. At the same time, these optimal backward reshaping functions can be guaranteed to be monotonically non-decreasing functions. Thus, unlike the inverse mappings generated under other approaches that do not implement the techniques as described herein, the optimal backward reshaping functions as described herein are able to represent inverses (or inverse mappings) to well-defined forward reshaping functions (or forward mappings), and are thus less likely to generate visual artifacts that affect visual qualities of the predicted HDR images.

In some embodiments, the backward reshaping functions as described herein are generated without performing clipping or trim passes and/or without causing complete informational loss in certain codeword regions of pixel values in mapping the SDR images to the predicted HDR images. As a result, image details represented in the SDR images in relation to the target HDR images are better preserved in the predicted HDR images under techniques as described herein.

In some embodiments, the backward reshaping functions as described herein can be used to support any combination of a source color space in which the SDR images are represented and a target color space in which a reconstructed version of the target HDR images that is derived from the predicted HDR images is represented. Example source and/or target color spaces may include, but are not necessarily only to, any of: YCbCr color space, IPT color space, RGB color space, Rec. 2020 color space, Rec. 709 color space, etc.

In some embodiments, the backward reshaping functions can be generated using one or more non-parametric (or modeless) histogram approximation (or histogram transfer) methods to approximate histograms of the target HDR images with histograms of the predicted HDR images. Some or all of these histogram approximation methods may operate without spatially aligning pixels of the SDR images, the predicted HDR images, and/or the target HDR images. Thus, even if the SDR images comprise a different number (e.g., fewer, more, etc.) pixels as compared with the target HDR images do, the backward reshaping functions can still be generated by the histogram approximation methods as described herein to relatively accurately generate the predicted HDR images that approximate the target HDR images with the same or similar luma and/or chroma looks.

Example histogram approximation methods may, but are not necessarily limited to, be CDF-based, MMR-based, CDF-and-MMR based, etc. In some embodiments, a histogram approximation as described herein may be applied to zero, one, two, three or more dimensions of a color space.

In a first example, a CDF-based histogram approximation method may be applied for mapping codewords in all luma and chroma components of an input SDR color space and an output HDR color space.

In a second example, an MMR-based histogram approximation method may be applied for mapping codewords in all luma and chroma components of an input SDR color space and an output HDR color space.

In a third example, CDF-based histogram approximation methods can be used for mapping some but not all of luma and chroma components, whereas an MMR-based histogram approximation method can be used for mapping some but not all of luma and chroma components.

CDF-Based Histogram Approximation

Denote the bit depth of the SDR images as SDR_bitdepth, and the number N of possible values in the SDR images as $2^{SDR\_bitdepth}$.

Further denote the minimal and maximal values within the $j^{th}$ target HDR image (or frame), in the target HDR images (or frames), as $v_j^L$ and $v_j^H$, and the minimal and maximal values within the $j^{th}$ SDR image (or frame), in the SDR images (or frames), as $s_j^L$ and $s_j^H$.

Total counts of pixels in the $j^{th}$ SDR image and the $j^{th}$ target HDR image may be respectively denoted as $P^s$ and $P^v$. In various embodiments, the total counts $P^s$ and $P^v$ of pixels in the $j^{th}$ SDR image and the $j^{th}$ target HDR image may be the same or may be different. Additionally, optionally or alternatively, the $j^{th}$ SDR image and the $j^{th}$ target HDR image may be of the same resolution or may be of different resolutions. Further, in various embodiments, the $j^{th}$ SDR image and the $j^{th}$ target HDR image may or may not be spatially aligned.

An SDR (codeword) histogram (or probability density functions) for the $j^{th}$ SDR image and an HDR (codeword) histogram for the $j^{th}$ target HDR image may be respectively denoted as $h_{jb}^s$ and $h_{jb}^v$, where b is the index for bins in the respective histograms of the $j^{th}$ SDR image and the $j^{th}$ target HDR image.

The histogram $h_{jb}^s$ comprises a plurality of SDR (codeword) histogram bins into which the entire SDR codeword space comprising all available SDR codewords for coding SDR images is partitioned or divided. Each SDR histogram bins is populated by a total count of SDR codewords in the SDR image that fall in an SDR codeword range corresponding to the SDR histogram bin.

The histogram $h_{jb}^v$ comprises a plurality of HDR (codeword) histogram bins into which the entire HDR codeword space comprising all available HDR codewords for coding HDR images is partitioned or divided. Each HDR histogram bins is populated by a total count of HDR codewords in the target HDR image that fall in an HDR codeword range corresponding to the HDR histogram bin.

Figure 2A:
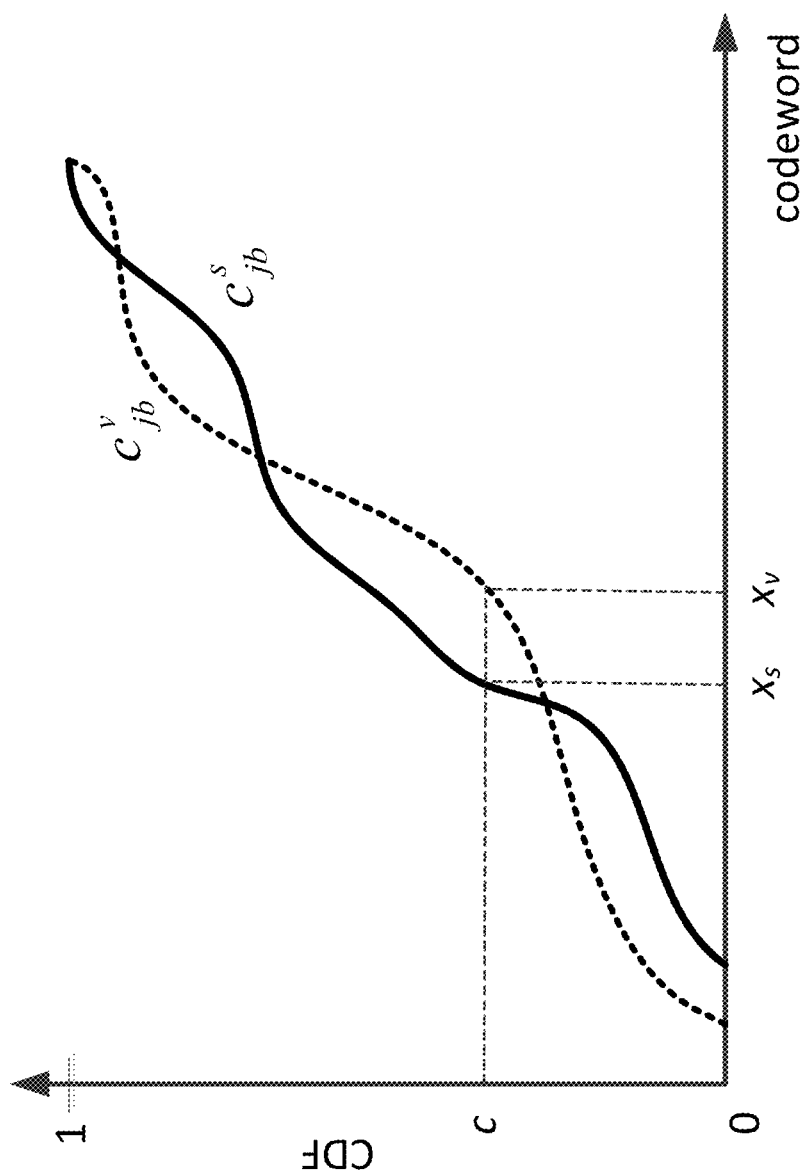
FIG. 2A illustrates CDFs for SDR and target HDR images.

Denote CDFs for the $j^{th}$ SDR image and the $j^{th}$ target HDR image respectively as $c_{jb}^s$ and $c_{jb}^v$, as illustrated in FIG. 2A. The CDFs $c_{jb}^s$ and $c_{jb}^v$ can be obtained from the histograms $h_{jb}^s$ and $h_{jb}^v$ by simply applying cumulative sums to the histogram bins in the histograms. For example, a CDF value of the CDF $c_{jb}^s$ for a given SDR histogram bin may be derived by summing all total counts/numbers of SDR codewords in all SDR histogram bins covering SDR codeword ranges up to and including an SDR codeword range corresponding to the given SDR histogram bin. Similarly, a CDF value of the CDF $c_{jb}^v$ for a given HDR histogram bin may be derived by summing all total counts/numbers of HDR codewords in all HDR histogram bins covering HDR codeword ranges up to and including an HDR codeword range corresponding to the given HDR histogram bin.

In some embodiments, the CDFs $c_{jb}^s$ and $c_{jb}^v$ may be used to find index pairs of SDR codewords of the SDR image and HDR codewords of the target HDR image. As used herein, an index pair as described herein comprises an SDR codeword (or SDR value) and an HDR codeword (or an HDR value) both of which codewords correspond to the same CDF value in their respective CDFs $c_{jb}^s$ and $c_{jb}^v$.

For example, in response to determining that an SDR codeword $x_s$ corresponds to a specific CDF value c in the CDF $c_{jb}^s$ and that an HDR codeword $x_v$ also corresponds to the same specific CDF value c in the CDF $c_{jb}^v$, it is then determined that the codewords $x_s$ and $x_v$ are an index pair to correspond to the same specific CDF value in their respective CDFs.

By varying different SDR codewords/values $x_s$ (or moving along the vertical direction a horizontal line/bar representing a CDF value and finding corresponding intercepts of the horizontal line/bar on the CDFs $c_{jb}^s$ and $c_{jb}^v$ in FIG. 2A), corresponding HDR codewords/values $x_v$ can be found so that SDR and HDR codewords $x_s$ and $x_v$ in each of index pairs formed by the different values of corresponds to the same matched CDF value in their respective CDFs $c_{jb}^s$ and $c_{jb}^v$. Under techniques as described herein, those index pairs, denoted as $(x_s, x_v)$, which associate the different SDR codewords/values $x_s$ to the corresponding HDR codewords/values $x_v$, can be used to define or specify a backward reshaping function that (inversely) maps SDR codeword/values to HDR codeword/values.

At the same time, those index pairs $(x_s, x_v)$ effectively represents a histogram transfer function that maps the histogram $h_{jb}^s$ derived from the SDR image to the histogram $h_{jb}^v$ derived from the target HDR image. That is, if SDR codewords in the $j^{th}$ SDR image are (inversely) mapped to predicted HDR codewords in the $j^{th}$ predicted HDR image based on the SDR-to-HDR codeword mappings represented by the index pairs $(x_s, x_v)$, then a mapped HDR histogram populated by inversely mapped (or predicted) HDR codewords of the $j^{th}$ predicted HDR image will have an identical, or at least a highly close approximation of, of the HDR histogram $h_{jb}^v$ of the $j^{th}$ target HDR image. Correspondingly, as the histograms of the $j^{th}$ predicted HDR image and the $j^{th}$ target HDR image match with each other, the $j^{th}$ predicted HDR image will likely have the same or closely approximated look of the $j^{th}$ target HDR image.

In some embodiments, the CDFs $c_{jb}^s$ and $c_{jb}^v$ may represent discrete valued functions (or discretized functions), as technically these distribution functions may be called cumulative mass functions (or CMFs). Thus, there may not exist an exact HDR codeword/value $x_v$ in the $j^{th}$ target HDR image that corresponds to the same specific CDF value c to which the SDR codeword/value $x_s$ in the $j^{th}$ SDR image exactly corresponds.

In various embodiments, one or more interpolation methods may be applied to find index pairs $(x_s, x_v)$. By way of example but not limitation, a bi-linear interpolation method can be used to find a corresponding HDR codeword/value (denoted as $T_{j,b}$) $x_v$ for any given SDR codeword/value (denoted as b) $x_s$, which may represent the b-th SDR histogram bin of the CDF $c_{jb}^s$.

In some embodiments, an HDR histogram bin index k in the CDF $c_{jb}^v$ can be found first such that the HDR histogram bin index k satisfies a relationship as follows:

$$c_{j,k-1}^v \le c_{j,b}^s \le c_{j,k}^v \quad (1)$$

where $c_{j,k-1}^v$ is the CDF value of the (k−1)-th HDR histogram bin of the CDF $c_{jb}^v$; $c_{j,k}^v$ is the CDF value of the k-th HDR histogram bin of the CDF $c_{jb}^v$; and $c_{j,b}^s$ is the CDF value of the given SDR codeword/value $x_s$. Here, the CDF value $c_{jb}^s$ can be derived by summing all total counts/numbers of SDR codewords in all SDR histogram bins covering SDR codeword ranges up to and including an SDR codeword range corresponding to the b-th SDR histogram bin. The CDF value $c_{j,k-1}^v$ may be derived by summing all total counts/numbers of HDR codewords in all HDR histogram bins covering HDR codeword ranges up to and including an HDR codeword range corresponding to the (k−1)-th HDR histogram bin. The CDF value $c_{j,k}^v$ may be derived by summing all total counts/numbers of HDR codewords in all HDR histogram bins covering HDR codeword ranges up to and including an HDR codeword range corresponding to the k-th HDR histogram bin.

In some embodiments, bilinear interpolation is performed between $c_{j,k-1}^v$ and $c_{j,k}^v$ to locate the corresponding HDR value $(T_{j,b})$ of $x_v$ for the given SDR value (b) of $x_s$ as follows:

$$T_{j,b} = (k-1) + \frac{c_{j,b}^s - c_{j,k-1}^v}{c_{j,k}^v - c_{j,k-1}^v} \quad (2)$$

Thus, a backward reshaping function (or a histogram transfer function) denoted as $\{T_{j,b}\}$ can be formed by HDR codeword/values over SDR codeword/values in the index pairs generated from the CDFs $c_{jb}^s$ and $c_{jb}^v$. Note that, as the CDFs $c_{jb}^s$ and $c_{jb}^v$ are by definition monotonically non-decreasing, the backward reshaping function $\{T_{j,b}\}$ as generated from the CDFs $c_{jb}^s$ and $c_{jb}^v$ is also monotonically non-decreasing, and represents a well-defined (e.g., well-behaved, etc.) function.

TABLE 1 below illustrates an example detailed algorithm for obtaining a histogram transfer function used to map a histogram of one or more SDR images to a histogram of one or more target HDR images that correspond to the one or more SDR images, which histogram transfer function can be used as a backward reshaping function for downstream devices to backward reshape the SDR images to predicted HDR images that closely approximate the target HDR images.

TABLE 1

```
// STEP 1: initialization
h_jb^s = 0 for b = 0, ..., 2^SDR_bitdepth − 1
h_jb^v = 0 for b = 0, ..., 2^HDR_bitdepth − 1
c_jb^s = 0 for b = −1, ..., 2^SDR_bitdepth − 1
c_jb^v = 0 for b = −1, ..., 2^HDR_bitdepth − 1
// STEP 2: scan for each pixel in SDR to build PDF
for ( i = 0 ; i < P^s; i ++ )
    h_{j,s_ji}^s ++;   // histogram for SDR
end
// scan for each pixel in target HDR to build PDF
for ( i = 0 ; i < P^v; i ++ )
    h_{j,v_ji}^v ++;   // histogram for target HDR
end
// STEP 3: build CDF
for(b = 0 : b < N; b ++ )
    c_{j,b}^s = c_{j,b−1}^s + h_{j,b}^s ; c_{j,b}^v = c_{j,b−1}^v + h_{j,b}^v
end
// STEP 4: normalized CDF to between [0 1]
for( b = 0 ; b < N; b ++ )
```

$$c_{j,b}^s = \frac{c_{j,b}^s}{P^s} \; ; c_{j,b}^v = \frac{c_{j,b}^v}{P^v}$$

```
end
// STEP 5: histogram transfer
for( b = 0 ; b < N; b ++ )
    // for each SDR CDF sample point, find the corresponding CDF value
    // find the HDR bins whose CDF cover the SDR CDF sample point.
    find k such that c_{j,k−1}^v ≤ c_{j,b}^s ≤ c_{j,k}^v
    // find the HDR CDF sample point
    perform interpolation based on c_{j,k−1}^v and c_{j,k}^v
```

$$T_{j,b} = (k-1) + \frac{c_{j,b}^s - c_{j,k-1}^v}{c_{j,k}^v - c_{j,k-1}^v}$$

```
end
// STEP 6: curve clipping no more than what has already been clipped in SDR
for( b= 0; b <= s_j^L; b++)
    T_{j,b} = v_j^L
end
for( b= s_j^H +1; b < N; b++)
```

TABLE 1-continued $T_{j,b} = v_j^H$
end
// STEP 7: curve smoothing $$T_{j,b} = \frac{1}{2W+1} \sum_{k=b-W}^{b+W} T_{j,k}$$

// STEP 8:rounding and clipping
$T_{j,b} = \text{clip3}(\text{round}(T_{j,b}),0,N-1)$ In some embodiments, backward reshaping data (e.g., analytical functions, non-analytical functions, lookup tables, sequences, etc.) that defines or specifies the backward reshaping function $\{T_{j,b}\}$ can be included as a part of image metadata delivered to downstream devices along with the SDR image.

In some embodiments, a set of polynomial pieces (e.g., representing an 8-piece $2^{nd}$ order polynomial, etc.) may be used to approximate the backward reshaping function $\{T_{j,b}\}$. In these embodiments, backward reshaping metadata comprising polynomial coefficients, pivots, offsets, etc. that define the set of polynomial pieces can be included as a part of image metadata delivered to downstream devices along with the SDR image.

A downstream device that receives the SDR image and the backward reshaping metadata may use the backward reshaping metadata to determine or reconstruct the backward reshaping function subject to coding errors generated in the coding block (120) and the decoding block (130). The reconstructed backward reshaping function can be used for mapping the SDR image to a predicted HDR image that is identical or relatively closely approximate the target HDR image.

Figure 2B:
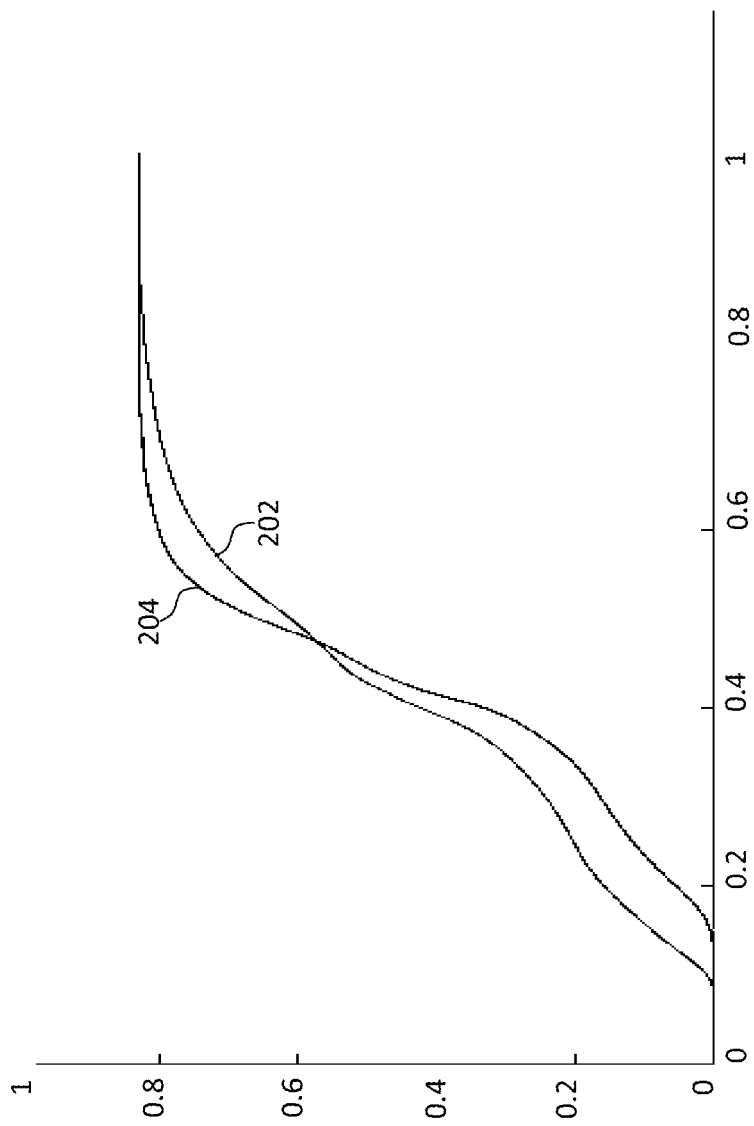
FIG. 2B illustrates an example SDR CDF for one or more SDR images and an example HDR CDF for one or more target HDR images that correspond to the one or more SDR images.

FIG. 2B illustrates an example first plot 202 of an SDR CDF for one or more SDR images and an example second plot 204 of an HDR CDF for one or more target HDR images that correspond to the one or more SDR images.

As represented by the plots 202 and 204 in FIG. 2B, in some embodiments, both SDR CDFs are normalized over the vertical axis (of FIG. 2B) that represents cumulative CDF values or cumulative counts (for plot 202) of pixels in the SDR images as well as cumulative CDF values or cumulative counts (for plot 204) of pixels in the HDR images. Further as represented by the plots 202 and 204 in FIG. 2B, in some embodiments, both SDR CDFs are defined or supported over normalized SDR and HDR codewords/values represented by the horizontal axis (of FIG. 2B).

Figure 2C:
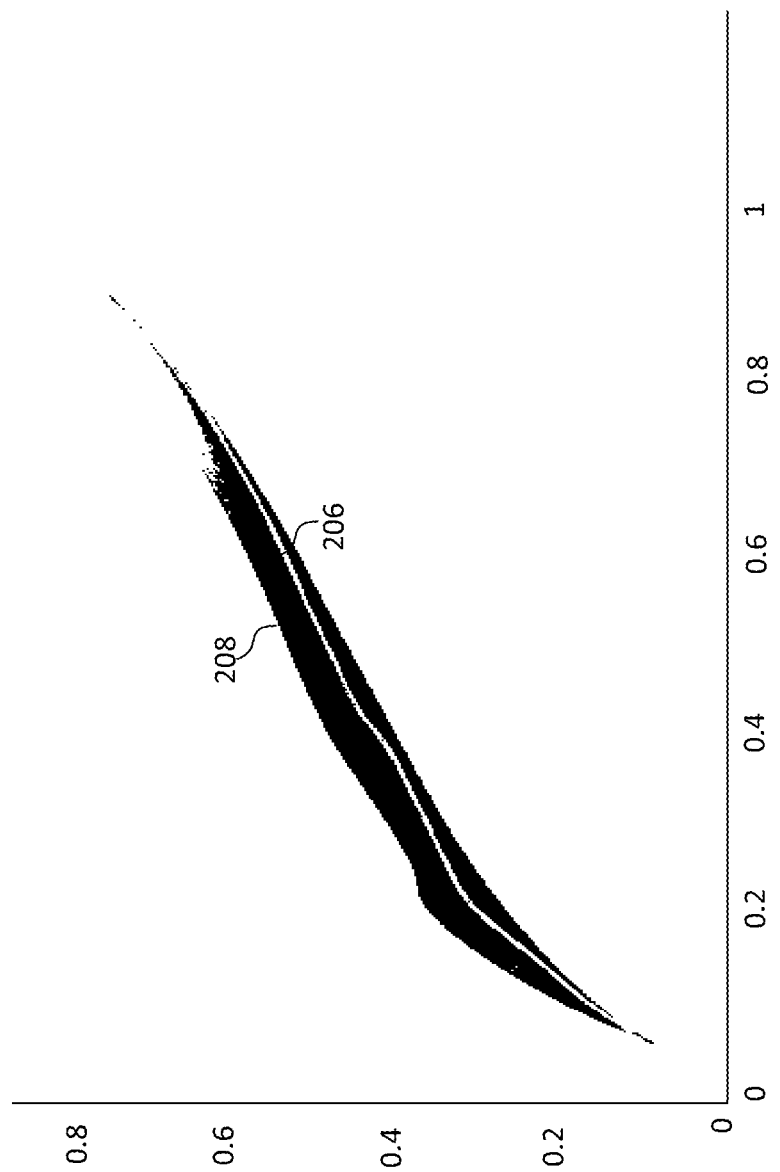
FIG. 2C illustrates an example backward reshaping function.

FIG. 2C illustrates an example backward reshaping function 206 generated from applying the algorithm as described in TABLE 1 to the SDR CDF for the SDR images and HDR CDF for the target HDR images. The backward reshaping function (206) can be used to map SDR codewords/values as represented by the horizontal axis (of FIG. 2C) to HDR codewords/values as represented by the vertical axis (of FIG. 2C) in predicted HDR images that approximate the target HDR images.

As can be seen in FIG. 2C, actual HDR values 208 in the target HDR images may not form a definite curve or function but rather may deviate or distribute around the backward reshaping function (206).

As previously noted, under some other approaches, a backward reshaping function may be obtained by optimizing a cost/error function to minimize distances/differences/errors between predicted HDR values and the target HDR values. These approaches may cause predicted HDR images to have different luma and/or chroma looks, even if the distances/differences/errors are minimized. Further, these approaches may generate a backward mapping function that is not monotonically non-decreasing.

In contrast, under techniques as described herein, backward reshaping function (206) is obtained by mapping SDR histogram bins of the SDR images to (e.g., exactly, interpolated, closely approximated, etc.) HDR histogram bins of the target HDR images. These techniques ensure similarity or identity between histograms of predicted HDR images and the target HDR images. Thus, the predicted HDR images are ensured to have similar luma and/or chroma looks as compared with the target HDR images. Further, these techniques are robust in handling a wide variety of images (e.g., not spatially aligned, not containing the same pixels, relatively wide deviations/distributions in HDR codewords relative to SDR codewords, etc.) as compared with other approaches. A backward reshaping function generated by these techniques is also guaranteed to be monotonically non-decreasing.

Figure 2D:
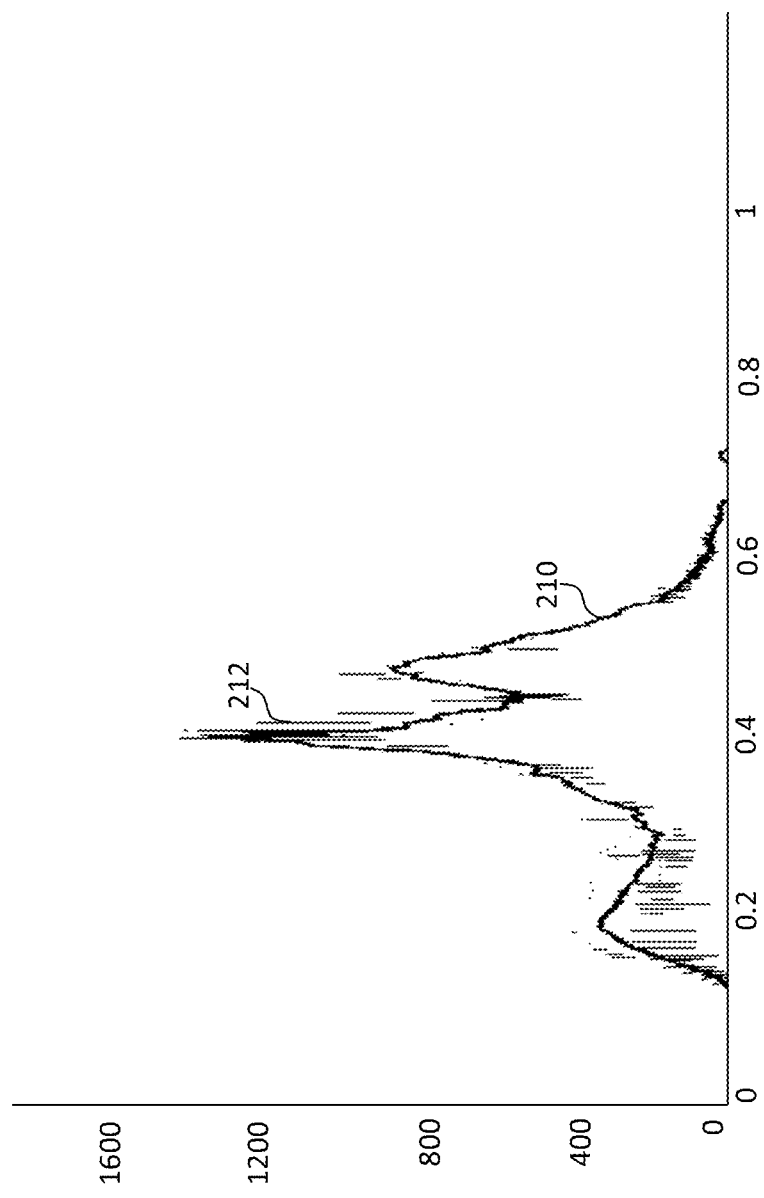
FIG. 2D illustrates an example first probability density function.

FIG. 2D illustrates an example first probability density function (PDF) 210 derived from predicted HDR values of the predicted HDR images and an example second PDF 212 derived from HDR values of the target HDR images. Similarities between these PDFs (210 and 212) as can be observed in FIG. 2D correlate to the fact that the predicted HDR images generated under techniques as described herein have similar luma and/or chroma looks as compared with the target HDR images.

As previously noted, some or all of histogram approximation methods (or histogram transfer methods) as described herein such as CDF-based methods, MMR-based methods, etc., may also be applied to two, three or more dimensions of a color space. Additionally, optionally or alternatively, some or all of histogram approximation methods as described herein may be applied to a single SDR image and a single target HDR image, as well as a set of more than one SDR image and a set of more than one HDR image or even an entire media program. Further, these methods do not require SDR images and target HDR images (that are used to generate backward reshaping functions) to be spatially aligned, and may or may not have the same numbers of pixels.

By way of illustration but not limitation, a CDF-based histogram approximation method can be applied to multiple color components (or multiple dimensions) as follows.

For simplicity, let $h^s(x^s,y^s)$ be an SDR histogram bin comprising a total count of pixels in a two-dimensional SDR codeword/value range corresponding to the SDR histogram bin, where the SDR histogram bin (or the two-dimensional SDR codeword/value range) may be indexed by a corresponding SDR pixel values $(x^s,y^s)$ in two color components of an SDR color space in which a set of SDR images represents a scene (in SDR media content). The SDR pixel values $(x^s,y^s)$ may comprise first (component) SDR codewords/values $x^s$ in one of the two color components of the SDR color space and second (component) SDR codewords/values $y^s$ in the other of the two color components of the SDR code space.

Further, let $h^v(x^v,y^v)$ be an HDR histogram bin comprising a total count of pixels in a two-dimensional HDR codeword/value range corresponding to the HDR histogram bin, where the HDR histogram bin (or the two-dimensional HDR codeword/value range) may be indexed by a corresponding HDR pixel values $(x^v,y^v)$ in two color components of an HDR color space in which a set of HDR images represents the same scene (in HDR media content) as that represented by the set of SDR images. The HDR pixel values $(x^v, y^v)$ may comprise first (component) HDR codewords/values $x^v$ in one of the two color components of the HDR color space and second (component) HDR codewords/values $y^v$ in the other of the two color components of the HDR color space.

In some embodiments, each dimension or each color component of SDR pixel values $(x^s, y^s)$ and HDR pixel values $(x^v, y^v)$ may be represented within the same normalized codeword/value range (e.g., [0-1]). Additionally, optionally or alternatively, each of the two color components of the (SDR) color space in which the normalized SDR pixel values $(x^s, y^s)$ are represented may be one of: a luma channel, a chroma channel, etc. Similarly, each of the two color components of the (HDR) color space in which the normalized HDR pixel values $(x^v, y^v)$ are represented may be one of: a luma channel, a chroma channel, etc.

Two-variable joint CDFs $c^s(x^s, y^s)$ and $c^v(x^v, y^v)$ may be derived from the histograms $h^s(x^s, y^s)$ and $h^v(x^v, y^v)$ as follows:

$$c^s(x^s, y^s) = \sum_{i=0}^{x^s} \sum_{j=0}^{y^s} h^s(i, j) \text{ for all } (x^s, y^s) \quad (3)$$

$$c^v(x^v, y^v) = \sum_{i=0}^{x^v} \sum_{j=0}^{y^v} h^v(i, j) \text{ for all } (x^v, y^v) \quad (4)$$

Furthermore, single-variable marginal CDFs $c_y^s(x^s)$, $c_y^v(x^v)$, $c_x^s(y^s)$ and $c_x^v(y^v)$ may be derived from the histograms $h^s(x^s, y^s)$ and $h^v(x^v, y^v)$ as follows:

$$c_y^s(x^s) = \sum_{i=0}^{x^s} \sum_{j=0}^{N-1} h^s(i, j) \text{ for all } x^s \quad (5)$$

$$c_y^v(x^v) = \sum_{i=0}^{x^v} \sum_{j=0}^{N-1} h^v(i, j) \text{ for all } x^v \quad (6)$$

$$c_x^s(y^s) = \sum_{i=0}^{N-1} \sum_{j=0}^{y^s} h^s(i, j) \text{ for all } y^s \quad (7)$$

$$c_x^v(y^v) = \sum_{i=0}^{N-1} \sum_{j=0}^{y^v} h^v(i, j) \text{ for all } y^v \quad (8)$$

By way of example but not limitation, the first component $x^v$ of the color components of the HDR color space corresponds to the first component $x^s$ of the color components of the SDR color space, whereas the second component $y^v$ of the color components of the HDR color space corresponds to the second component $y^s$ of the color components of the SDR color space.

In some embodiments, to simplify CDF searches (for same CDF values) in multiple dimensions, the first search may be conducted along one (e.g., a selected one, etc.) of the multiple dimensions using either a pair of marginal CDFs comprising the marginal CDFs $c_y^s(x^s)$ and $c_y^v(x^v)$ or a pair of marginal CDFs comprising the marginal CDFs $c_x^s(y^v)$ and $c_x^v(y^v)$. In a non-limiting example, the first searches may be efficiently implemented as linear searches.

In some embodiments, after the joint CDFs for the two dimensions and the marginal CDFs that are collapsed into single dimensions are obtained from the histograms, cumulative values (or cumulative counts of pixels in histogram bins) in these CDFs may be normalized by their respective (e.g., per-image, etc.) total pixel counts $FP^s$ and $FP^v$ in their respective sets of (SDR and target HDR) images, as follows:

$$\tilde{c}^s(x^s, y^s) = \frac{c^s(x^s, y^s)}{FP^s} \quad (9)$$

$$\tilde{c}^v(x^v, y^v) = \frac{c^v(x^v, y^v)}{FP^v} \quad (10)$$

$$\tilde{c}_y^s(x^s) = \frac{c_y^s(x^s)}{FP^s} \quad (11)$$

$$\tilde{c}_y^v(x^v) = \frac{c_y^v(x^v)}{FP^v} \quad (12)$$

$$\tilde{c}_x^s(y^s) = \frac{c_x^s(y^s)}{FP^s} \quad (13)$$

$$\tilde{c}_x^v(y^v) = \frac{c_x^v(y^v)}{FP^v} \quad (14)$$

Figure 3A:
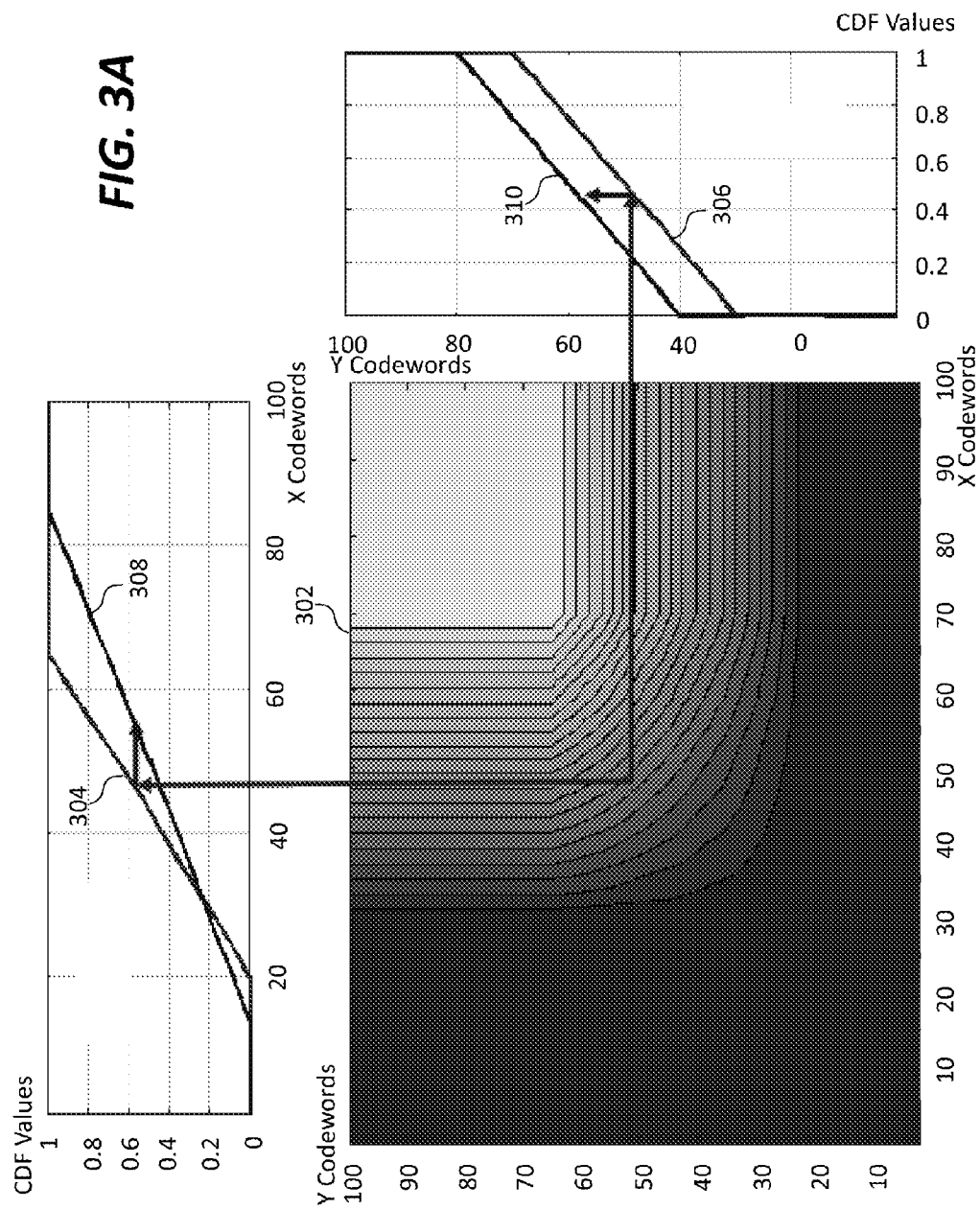
FIG. 3A through FIG. 3E illustrate example two-variable joint and single-variable marginal CDFs.

FIG. 3A illustrates an example two-variable (or two dimensional) joint CDF 302 for a set of SDR images and two example single-variable (or one-dimensional) marginal CDFs 304 and 306 that may be derived from collapsing one of the two dimensions (or color components) in the joint CDF 302 for the set of SDR images.

By way of example but not limitation, the marginal CDF 304 corresponds to the first component $x^s$ of the color components of the SDR color space, whereas the marginal CDF 306 corresponds to the second component $y^s$ of the color components of the SDR color space. The marginal CDF 308 corresponds to the first component $x^v$ of the color components of the HDR color space, whereas the marginal CDF 310 corresponds to the second component $y^v$ of the color components of the HDR color space.

In some embodiments, the first search may be conducted using a pair of marginal CDFs comprising (a) one of the two marginal (SDR) CDFs 304 and 306 derived from the joint CDF 302 for the set of SDR images and (b) a corresponding one of two marginal (HDR) CDFs 308 and 310 that may be derived from collapsing one of the two dimensions (or color components) in a two-variable (or two dimensional) joint (HDR) CDF (not shown) for a set of HDR images (which corresponds to the set of SDR images).

TABLE 2 below illustrates an example algorithm for obtaining a two-dimensional histogram transfer function used to map a two-variable histogram of a set of one or more SDR images to a two-variable histogram of a set of one or more target HDR images that correspond to the one or more SDR images, which two-dimensional histogram transfer function can be used as a backward reshaping function for downstream devices to backward reshape the one or more SDR images to predicted HDR images that closely approximate the one or more target HDR images.

TABLE 2

For each $(x^s, y^s)$ in SDR domain
    // find the joint CDF $c^s(x^s, y^s)$
    Find $c^s(x^s, y^s)$ from SDR joint CDF
    // find the corresponding $c_y^s(x^s)$
    Find $c_y^s(x^s)$ from SDR marginal CDF
    // find $x^v$ for $x^s$
    // e.g., by matching between the marginal CDFs (304 and 308)
    Find $x^v$ such that $c_y^v(x^v) = c_y^s(x^s)$ from EDR marginal CDF
    // find $y^v$ in $(x^v, y^v)$ for $y^s$ in $(x^s, y^s)$
    // e.g., by searching in the joint CDFs (302) and $c^v(x^v, y^v)$ TABLE 2-continued Find $y^v$ such that $c^v(x^v,y^v) = c^s(x^s,y^s)$ from EDR joint CDF
End Note that instead of conducting the first search with the x marginal CDF (304) as shown in TABLE 2, in some other embodiments, the first search can be conducted with the y marginal CDF (306), followed by a search in the joint CDF (302).

For the purpose of illustration, it has been described that in two dimensional scenarios, a first search may be conducted with one of the two marginal SDR CDFs against a corresponding one of the two marginal HDR CDFs, followed by a second search with the two dimensional joint SDR CDF against the two dimensional joint HDR CDF. It should be noted that in various embodiments, these and other strategies may be used to generate index pairs (which is then used to generate a histogram transfer function or a backward reshaping function) as described herein.

Figure 3B:
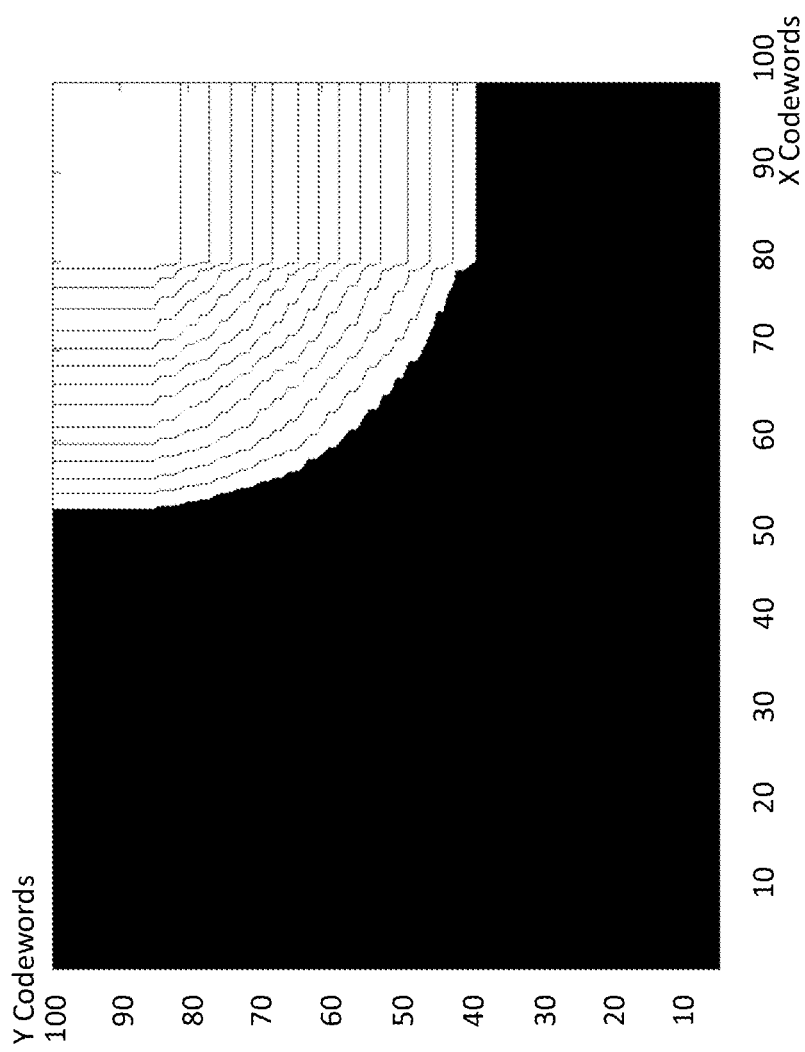

In some embodiments, searches with marginal CDFs are not made. Rather, a direct search (which is a two-dimensional search) can be made with the two dimensional joint SDR CDF against the two dimensional joint HDR CDF. FIG. 3B illustrates an example two-dimensional joint HDR CDF for predicted HDR images that are generated by backward reshaping functions based on the direct search made with the two dimensional joint SDR CDF against the two dimensional joint HDR CDF.

In some embodiments, one or more first searches (each of which is a one-dimensional search) may be conducted with one or both of the two marginal SDR CDFs (304) and (306) against one or both of the two marginal HDR CDFs (308) and (310). In some embodiments, the first searches may be followed by a further search with the two dimensional joint SDR CDF against the two dimensional joint HDR CDF. In some embodiments, the further search in the two dimensional joint CDFs may be a one-dimensional search with the other dimension already given/fixed in one or both of the first searches.

Figure 3C:
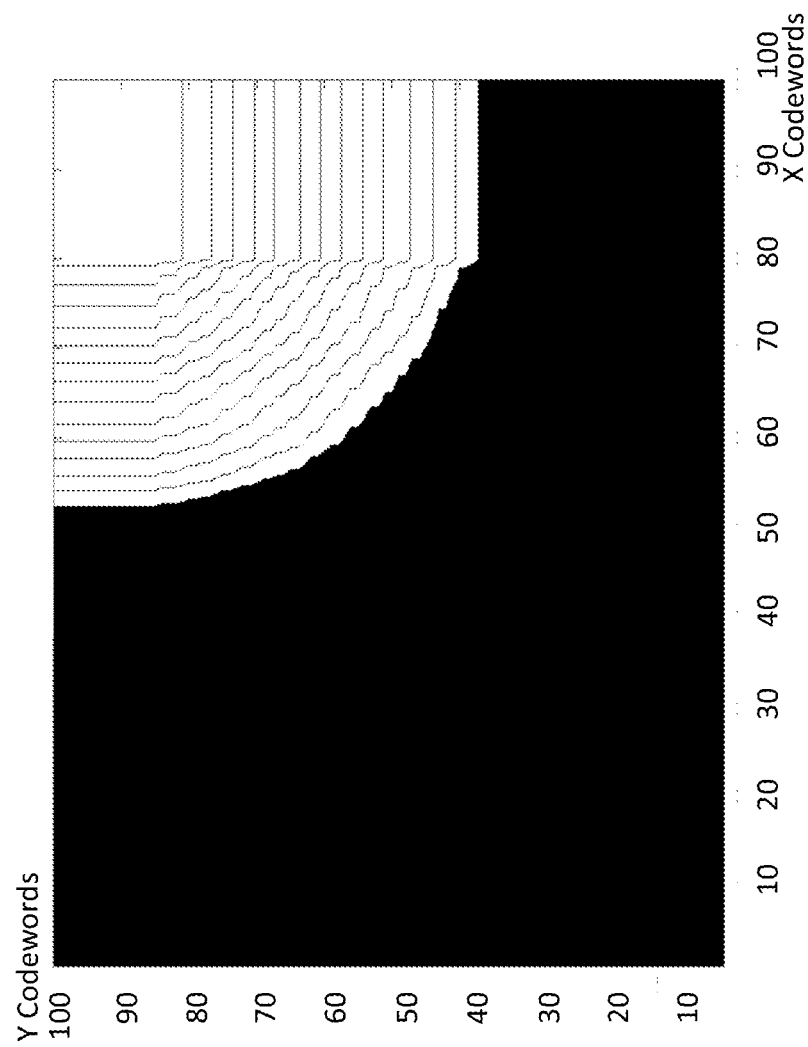

FIG. 3C illustrates an example two-dimensional joint HDR CDF for predicted HDR images that are generated by backward reshaping functions based on a combination of a first search made in the Cb color component(s) of YCbCr color space(s) with a one-dimensional marginal SDR CDF against a one-dimensional marginal HDR CDF and a further search subsequently made with the two dimensional joint SDR CDF against the two dimensional joint HDR CDF. Results of the first search may be used to fix in the Cb color component for the purpose of reducing the further search to a one-dimensional search in the two dimensional joint CDFs.

In some embodiments, each of the two searches with the two CDFs (304) and (306) may be followed by a respective search in the joint CDF (302); thus, two (e.g., candidate) index pairs of $\{(x^s,y^s), (x^v,y^v)\}$ may be derived in these other embodiments.

In some embodiments, one of the two index pairs of $\{(x^s,y^s), (x^v,y^v)\}$ may be selected to map $(x^s,y^s)$ for the set of SDR images to $(x^v,y^v)$ for the set of HDR images.

In some embodiments, the two index pairs of $\{(x^s,y^s), (x^v,y^v)\}$ may be used to define a local area for searching for an optimal value of $(x^v,y^v)$ to which a specific value of $(x^s,y^s)$ is to be mapped. The optimal value of $(x^v,y^v)$ to which the specific value of $(x^s,y^s)$ is to be mapped may be determined as corresponding to the best matching CDF value for the set of HDR images as compared with the CDF value for the set of SDR images at $(x^s,y^s)$. The search for the optimal value of $(x^v,y^v)$ to which a specific value of $(x^s,y^s)$ is to be mapped in the local area defined by the two index pairs of $\{(x^s,y^s), (x^v,y^v)\}$ can maximize histogram similarity by way of finding the best match in the two-dimensional joint CDFs (302) and $c^v(x^v,y^v)$. As the search for the optimal value incorporates results of the first searches for both of the marginal CDFs, the matches between a predicted CDF for the predicted HDR images and the CDF for the target HDR images can be relatively balanced, free of biases that may be introduced by using results of a first search for only one of the marginal CDFs, and robust in dealing with varying degrees of correlations between color components of the SDR color space and color components of the HDR color space.

By way of illustration but not limitation, two two-dimensional values (or two candidate values) of $(x^v,y^v)$ in the two index pairs of $\{(x^s,y^s), (x^v,y^v)\}$ as generated by conducting the first searches in both the x marginal CDF (304) and the y marginal CDF (306) are denoted as $(x^v(1),y^v(1))$ and $(x^v(2),y^v(2))$. In a non-limiting example, the local area for searching for the optimal value of $(x^v,y^v)$ to which $(x^s,y^s)$ is to be mapped may be set as a rectangle formed by four two-dimensional points $(x^v(1),y^v(1))$, $(x^v(2),y^v(2))$, $(x^v(1),y^v(2))$ and $(x^v(2),y^v(1))$.

Figure 3D:
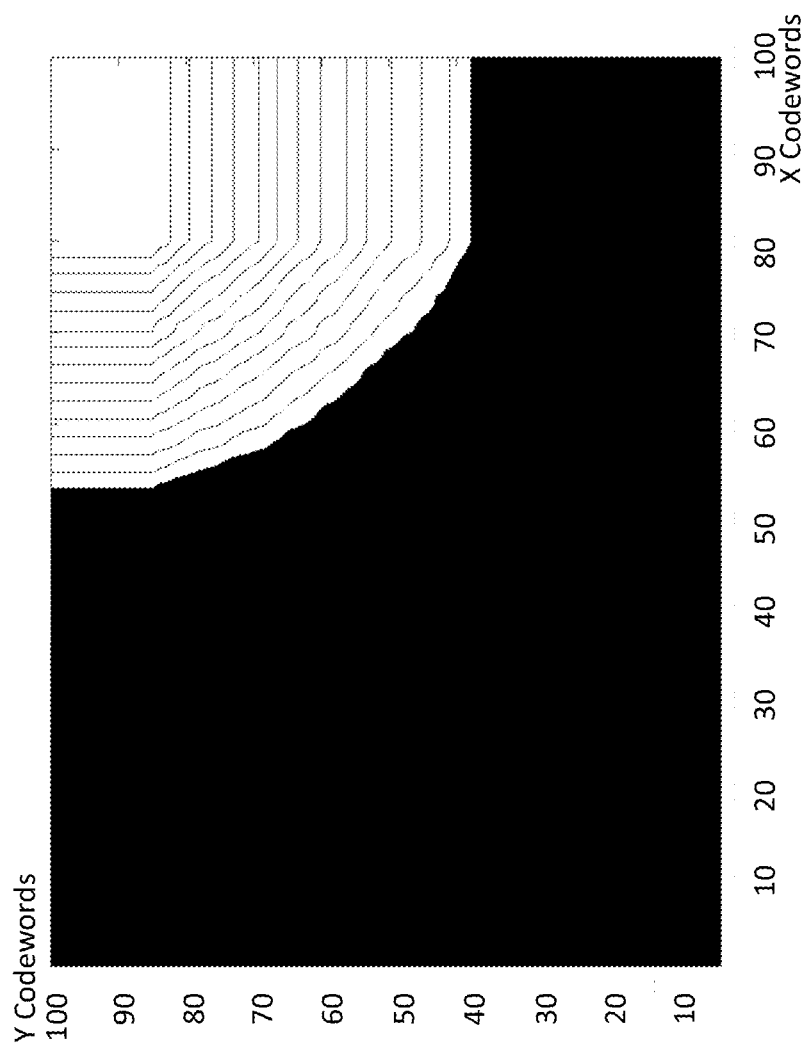

FIG. 3D illustrates an example two-dimensional joint HDR CDF for predicted HDR images that are generated by backward reshaping functions based on a combination of first searches made with both one-dimensional marginal SDR CDFs against respective dimensional marginal HDR CDFs and a further search subsequently made with the two dimensional joint SDR CDF against the two dimensional joint HDR CDF. Results of the first searches may be used to determine a local area for the purpose of confining the further search to the local area in the two dimensional joint CDFs.

Figure 3E:
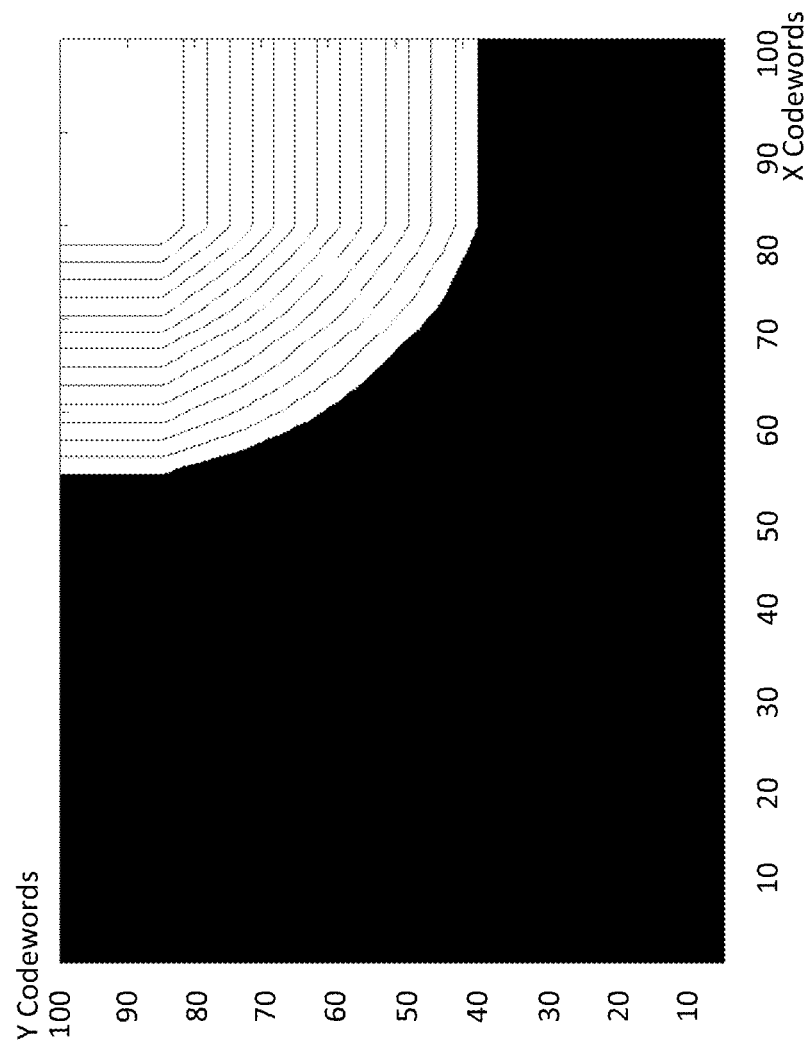

FIG. 3E illustrates an example two-dimensional joint HDR CDF for target HDR images. As compared with the two-dimensional joint HDR CDF of FIG. 3B, the two-dimensional joint HDR CDF of FIG. 3C provides a relatively smooth high-quality match with the two-dimensional joint HDR CDF of FIG. 3E for the target HDR images. Further, as compared with the two-dimensional joint HDR CDF of FIG. 3B and FIG. 3C, the two-dimensional joint HDR CDF of FIG. 3D provides a relatively smooth high-quality match with the two-dimensional joint HDR CDF of FIG. 3E for the target HDR images.

A CDF-based histogram approximation method as illustrated for one and two dimensions can be extended to three or even higher dimension.

For simplicity, let $h^s(x^s,y^s,z^s)$ be a total count of pixels that have same SDR pixel values as $(x^s,y^s,z^s)$ in three dimensions (or color components) of an SDR color space within a set of SDR images representing a scene (in SDR media content). Further, let $h^v(x^v,y^v,z^v)$ be a total count of pixels that have same HDR pixel values as $(x^v,y^v,z^v)$ in three dimensions (or color components) of an HDR color space within a set of HDR images representing the same scene (in HDR media content). In some embodiments, each dimension or each color component of SDR pixel values $(x^s,y^s,z^s)$ and HDR pixel values $(x^v,y^v,z^v)$ may be represented within a normalized codeword/value range (e.g., [0-1]).

A three-variable joint CDF may be derived from the histograms $h^s(x^s,y^s,z^s)$ and $h^v(x^v,y^v,z^v)$ as follows:

$$c^s(x^s, y^s, z^s) = \sum_{i=0}^{x^s} \sum_{j=0}^{y^s} \sum_{k=0}^{z^s} h^s(i, j, k) \text{ for all } (x^s, y^s, z^s) \quad (15)$$

$$c^v(x^v, y^v, z^v) = \sum_{i=0}^{x^v} \sum_{j=0}^{y^v} \sum_{k=0}^{z^v} h^v(i, j, k) \text{ for all } (x^v, y^v, z^v) \quad (16)$$

Furthermore, single-variable marginal CDFs $c_{yz}^s(x^s)$, $c_{xy}^s(z^s)$, $c_{xz}^s(y^s)$, $c_{yz}^v(x^v)$, $c_{xy}^v(z^v)$ and $c_{xz}^v(y^v)$ may be derived from the histograms $h^s(i,j,k)$ and $h^v(i,j,k)$ as follows:

$$c_{yz}^s(x^s) = \sum_{i=0}^{x^s} \sum_{j=0}^{N-1} \sum_{k=0}^{N-1} h^s(i, j, k) \quad (17)$$

$$c_{xy}^s(z^s) = \sum_{k=0}^{z^s} \sum_{i=0}^{N-1} \sum_{j=0}^{N-1} h^s(i, j, k) \quad (18)$$

$$c_{xz}^s(y^s) = \sum_{j=0}^{y^s} \sum_{i=0}^{N-1} \sum_{k=0}^{N-1} h^s(i, j, k) \quad (19)$$

$$c_{yz}^v(x^v) = \sum_{i=0}^{x^v} \sum_{j=0}^{N-1} \sum_{k=0}^{N-1} h^v(i, j, k) \quad (20)$$

$$c_{xy}^v(z^v) = \sum_{k=0}^{z^v} \sum_{i=0}^{N-1} \sum_{j=0}^{N-1} h^v(i, j, k) \quad (21)$$

$$c_{xz}^v(y^v) = \sum_{j=0}^{y^v} \sum_{i=0}^{N-1} \sum_{k=0}^{N-1} h^v(i, j, k) \quad (22)$$

In some embodiments, to simplify CDF searches in multiple dimensions, one or more searches may be first conducted along one or more of the multiple dimensions using one or more pairs of marginal CDFs (e.g., a pair comprising the marginal CDFs $c_{yz}^s(x^s)$ and $c_{yz}^v(x^v)$, a pair comprising the marginal CDFs $c_{xy}^s(z^s)$ and $c_{xy}^v(z^v)$, a pair comprising the marginal CDFs $c_{xz}^s(y^s)$ and $c_{xz}^v(y^v)$, etc.).

In some embodiments, after the joint CDFs for the three dimensions and the marginal CDFs that are collapsed into single dimensions are obtained from the histograms, cumulative values (or cumulative counts of pixels in histogram bins) in these CDFs may be normalized by their respective total pixel counts in their respective sets of (SDR and target HDR) images, as follows:

$$c^s(x^s, y^s, z^s) = \frac{c^s(x^s, y^s, z^s)}{FP^s} \quad (23)$$

$$c^v(x^v, y^v, z^v) = \frac{c^v(x^v, y^v, z^v)}{FP^v} \quad (24)$$

$$c_{yz}^s(x^s) = \frac{c_{yz}^s(x^s)}{FP^s} \quad (25)$$

$$c_{xy}^s(x^s) = \frac{c_{xy}^s(x^s)}{FP^s} \quad (26)$$

$$c_{xz}^s(x^s) = \frac{c_{xz}^s(x^s)}{FP^s} \quad (27)$$

$$c_{yz}^v(x^v) = \frac{c_{yz}^v(x^v)}{FP^v} \quad (28)$$

$$c_{xy}^v(x^v) = \frac{c_{xy}^v(x^v)}{FP^v} \quad (29)$$

$$c_{xz}^v(x^v) = \frac{c_{xz}^v(x^v)}{FP^v} \quad (30)$$

TABLE 3 below illustrates an example algorithm for obtaining a three-dimensional histogram transfer function used to map a three-variable histogram of a set of one or more SDR images to a three-variable histogram of a set of one or more target HDR images that correspond to the one or more SDR images, which three-dimensional histogram transfer function can be used as a backward reshaping function for downstream devices to backward reshape the one or more SDR images to predicted HDR images that closely approximate the one or more target HDR images.

TABLE 3

For each $(x^s,y^s,z^s)$ in SDR domain
    // find the joint CDF $c^s$ $(x^s,y^s,z^s)$
    Find $c^s$ $(x^s,y^s,z^s)$ from SDR joint CDF
    // find the corresponding $c_{yz}^s$ $(x^s)$ and $c_{xz}^s$ $(y^s)$
    Find $c_{yz}^s$ $(x^s)$ from SDR marginal CDF
    Find $c_{xz}^s$ $(y^s)$ from SDR marginal CDF
    // find $x^v$ for $x^s$
    Find $x^v$ such that $c_{yz}^v$ $(x^v)$ = $c_{yz}^s$ $(x^s)$ from EDR marginal CDF
    // find $y^v$ for $y^s$
    Find $y^v$ such that $c_{xz}^v$ $(y^v)$ = $c_{xz}^s$ $(y^s)$ from EDR marginal CDF
    // e.g., by searching in the joint CDFs $c^v$ $(x^v,y^v,z^v)$ and $c^s$ $(x^s, y^s,z^s)$
    Find $z^v$ such that $c^v$ $(x^v,y^v,z^v)$ = $c^s$ $(x^s,y^s,z^s)$ from EDR joint CDF
End Note that instead of the first searches to be conducted with the two pairs of marginal CDFs such as $c_{yz}^s(x^s)/c_{yz}^v(x^v)$ and $c_{xz}^s(y^s)/c_{xz}^v(y^v)$ as illustrated in TABLE 3, in some other embodiments, the first searches can be conducted with the two pairs of marginal CDFs such as $c_{xz}^s(y^s)/c_{xz}^v(y^v)$ and $c_{xy}^s(z^s)/c_{xy}^v(z^v)$, followed by a search in the pair of joint CDFs $c^s(x^s,y^s,z^s)/c^v(x^v,y^v,z^v)$. Additionally, optionally or alternatively, in some other embodiments, the first searches can be conducted with the two pairs of marginal CDFs such as $c_{xy}^s(z^s)/c_{xy}^v(z^v)$ and $c_{yz}^s(x^s)/c_{yz}^v(x^v)$, followed by a search in the pair of joint CDFs $c^s(x^s,y^s,z^s)/c^v(x^v,y^v,z^v)$.

In some embodiments, one or more first searches may be conducted for one or more of all possible combination of the marginal CDFs. Each of the first searches may be respectively followed by a corresponding search in the joint CDFs $c^s(x^s,y^s,z^s)$ and $c^v(x^v,y^v,z^v)$.

In some embodiments, an index pair of $\{(x^s,y^s,z^s), (x^v,y^v,z^v)\}$ may be selected among one of one or more solutions (or one or more candidate index pairs) derived from the one or more first searches among the all possible combinations of the marginal CDFs followed by corresponding searches in the joint CDFs $c^s(x^s,y^s,z^s)$ and $c^v(x^v,y^v,z^v)$. This index pair may be used to map $(x^s,y^s,z^s)$ for the set of SDR images to $(x^v,y^v,z^v)$ for the set of HDR images.

In some embodiments, multiple (candidate) index pairs of $\{(x^s,y^s,z^s), (x^v,y^v,z^v)\}$ may be obtained as the solutions from the first searches among the all possible combinations of the marginal CDFs followed by corresponding searches in the joint CDFs $c^s(x^s,y^s,z^s)$ and $c^v(x^v,y^v,z^v)$. These multiple index pairs of $\{(x^s,y^s,z^s), (x^v,y^v,z^v)\}$ may be used to define a local spatial portion (e.g., a triangle, a rectangular area, a rectangular volume, a cube, etc.) for searching for an optimal value of $(x^v,y^v,z^v)$ (e.g., the closest match between CDF values in the joint CDFs $c^s(x^s,y^s,z^s)$ and $c^v(x^v,y^v,z^v)$ in a portion of the multi-channel codeword space) to which a given value of $(x^s,y^s,z^s)$ is to be mapped.

By way of example but not limitation, the optimal value of $(x^v,y^v,z^v)$ may be determined as corresponding to the best matching CDF value for the set of HDR images as compared with the CDF value for the set of SDR images at the given value of $(x^s,y^s,z^s)$ as follows. Three three-dimensional values of $(x^v,y^v,z^v)$ in the three index pairs of $\{(x^s,y^s,z^s), (x^v,y^v,z^v)\}$ are generated by (a) conducting the first searches with the two pairs of marginal CDFs such as $c_{yz}^s(x^s)/c_{yz}^v(x^v)$ and $c_{xz}^s(y^s)/c_{xz}^v(y^v)$ followed by a search in the pair of joint CDFs $c^s(x^s,y^s,z^s)/c^v(x^v,y^v,z^v)$; (b) conducting the first searches in the two pairs of marginal CDFs $c_{xz}^s(y^s)/c_{xz}^v(y^v)$ and $c_{xy}^s(z^s)/c_{xy}^v(z^v)$, followed by a search in the pair of joint CDFs $c^s(x^s,y^s,z^s)/c^v(x^v,y^v,z^v)$; and (c) conducting the first searches with the two pairs of marginal CDFs $c_{xy}^s(z^s)/c_{xy}^v(z^v)$ and $c_{yz}^s(x^s)/c_{yz}^v(x^v)$, followed by a search in the pair of joint CDFs $c^s(x^s,y^s,z^s)/c^v(x^v,y^v,z^v)$.

The three three-dimensional values of $(x^v,y^v,z^v)$ in the three index pairs of $\{(x^s,y^s,z^s), (x^v,y^v,z^v)\}$ may be denoted respectively as $(x^v(1),y^v(1),z^v(1))$, $(x^v(2),y^v(2),z^v(2))$ and $(x^v(3),y^v(3),z^v(3))$.

Any of a variety of local spatial portions (e.g., a rectangular area, a rectangular volume, a cube, etc.) as at least partly defined by these points or additional points may be used to search for an optimal value of $(x^v,y^v,z^v)$ to which the given value of $(x^s,y^s,z^s)$ is to be mapped.

In a non-limiting example, the local spatial portion for searching for the optimal value of $(x^v,y^v,z^v)$ to which the given value of $(x^s,y^s,z^s)$ is to be mapped may be set as a triangle formed by the three-dimensional points $(x^v(1),y^v(1),z^v(1))$, $(x^v(2),y^v(2),z^v(2))$ and $(x^v(3),y^v(3),z^v(3))$.

In another example, the local spatial portion for searching for the optimal value of $(x^v,y^v,z^v)$ to which the given value of $(x^s,y^s,z^s)$ is to be mapped may be set as a rectangular volume formed by maximum displacements/differences in $x^v$, $y^v$ and $z^v$ dimensions among the three-dimensional points $(x^v(1),y^v(1),z^v(1))$, $(x^v(2),y^v(2),z^v(2))$ and $(x^v(3),y^v(3),z^v(3))$.

Additionally, optionally or alternatively, as a part of searching for the optimal value, one or more of distance calculation, sorting, etc., may be performed by an upstream device as described herein.

MMR-Based Histogram Approximation

As previously noted, in addition to or in place of an CDF-based histogram approximation method, an MMR-based histogram approximation method may be applied to generate a backward reshaping mapping (or a histogram transfer function) that backward reshapes codewords from a set of SDR images (e.g., a single SDR image, a group of SDR images, in a scene depicted in SDR video content, etc.) to a set of predicted (or backward reshaped) HDR images that approximates a set of target HDR images (e.g., a single target HDR image, a group of target HDR images, in the scene depicted in HDR video content, etc.). In some embodiments, the MMR-based backward reshaping mapping may be derived by minimizing a cost/error function based at least in part on SDR histogram bins derived from the set of SDR images and HDR histogram bins derived from a set of target HDR images that corresponds to the set of SDR images.

The backward reshaping mapping as generated by the MMR-based histogram approximation method can be used to backward reshape codewords of one or more color components of an SDR color space in the set of SDR images to codewords of one or more color components of an HDR color space in which the set of backward reshaped images that approximates the set of target HDR images is represented. In some embodiments, some or all of the color components of the SDR color space and/or the color components of the HDR color space involved in the MMR-based histogram approximation method may be chroma components (or dimensions).

In some embodiments, the MMR-based histogram approximation method may employ/use a multivariate multi-regression (MMR) predictor that predicts/approximates HDR codewords (in some or all of color components of an HDR color space) in the set of target HDR images based on SDR codewords (in some or all of color components of an SDR color space) in the set of SDR images. Some examples of MMR-based prediction are described in U.S. Pat. No. 8,811,490, "Multiple color component multiple regression predictor," which is hereby incorporated by reference as if fully set forth herein. Additional examples of MMR-based luma and/or chroma reshaping are described in U.S. Provisional Application No. 62/312,450 (or the '450 application), filed on Mar. 23, 2016, entitled "Encoding and Decoding Reversible Production-Quality Single-Layer Video Signals" by Guan-Ming Su et al.

Some or all of MMR coefficients (e.g., 1D-LUT, 3D-LUT, multi-dimensional LUT, one or more matrixes, one or more functions/curves, etc.) defining the MMR predictor that is used in the MMR-based histogram approximation method can be included as a part of backward reshaping metadata to be delivered along with the (e.g., compressed) SDR images to downstream devices. In some embodiments, syntax elements or data fields as specified in video encoding protocols/standards for transfer functions, mapping functions, etc., may be used to carry, represent or approximate some or all of the MMR coefficients. These syntax elements or data fields can be included as a part of backward reshaping metadata to be delivered along with the (e.g., compressed) SDR images to downstream devices, in addition to or instead of some or all of the MMR coefficients that define the MMR predictor.

Additionally, optionally or alternatively, in some embodiments, syntax elements or data fields as specified in video encoding protocols/standards for MMR coefficients may be used to represent backward reshaping functions generated by one or more CDF-based histogram approximation methods, polynomials approximating backward reshaping functions, histogram transfer functions, mapping functions, etc. These syntax elements or data fields can be included as a part of backward reshaping metadata to be delivered along with the (e.g., compressed) SDR images to downstream devices, in addition to or instead of some or all of operational parameters specifying/defining the backward reshaping functions generated by the CDF-based histogram approximation methods, polynomials approximating backward reshaping functions, histogram transfer functions, inverse mapping functions, etc.

By way of illustration but not limitation, a second-order MMR predictor is to map SDR codewords $x_i^s$, $y_i^s$ and $z_i^s$ of the $i^{th}$ SDR images in three color components (or dimensions) of an SDR color space to HDR codewords $y_i^v$ and $z_i^v$ of the $i^{th}$ HDR images in two color components (or dimensions) of an SDR color space. Any of color components in the SDR color space and/or HDR color space may be a chroma channel or a luma channel. Note that in various embodiments any of second-order or non-second-order MMR predictors may be used.

The second-order MMR predictor may be represented as follows:

$$y_i^v \approx \sum_{a=0}^{2}\sum_{b=0}^{2}\sum_{c=0}^{2} m_{a,b,c}^y (x_i^s)^a (y_i^s)^b (z_i^s)^c \quad (31)$$

-continued $$z_i^y \approx \sum_{a=0}^{2}\sum_{b=0}^{2}\sum_{c=0}^{2} m_{a,b,c}^z (x_i^s)^a (y_i^s)^b (z_i^s)^c \qquad (32)$$

where $m_{a,b,c}^y$ represents a first set of MMR coefficients, which defines a first second-order form (or matrix) that maps the SDR codewords $x_i^s$, $y_i^s$ and $z_i^s$ of the $i^{th}$ SDR images to the HDR codewords $y_i^v$ of the $i^{th}$ HDR images; $m_{a,b,c}^z$ represents a second set of MMR coefficients, which defines a second second-order form (or matrix) that maps the SDR codewords $x_i^s$, $y_i^s$ and $z_i^s$ of the $i^{th}$ SDR images to the HDR codewords $z_i^v$ of the $i^{th}$ HDR images.

In some embodiments, to construct the MMR predictor, only MMR coefficients over pixel values $(x_i^s, y_i^s, z_i^s)$ with non-empty SDR histogram bins ($h^s(x,y,z)>0$) need to be determined. In other words, dimensions of (or the total numbers of terms in) the second order forms (or matrixes) in expressions (31) and (32) above to be used in the least square solution are not fixed but rather depend on non-empty histogram bins.

For each $(x_i^s, y_i^s, z_i^s)$ at which $h^s(x,y,z)>0$, an SDR input vector $s_i$ can be constructed as containing all combinations of polynomial terms $[(x_i^s)^a (y_i^s)^b (z_i^s)^c]$, where $0<=a<=2$, $0<=b<=2$ and $0<=c<=2$. In addition, an HDR input vector $q_i$ as containing $$\begin{bmatrix} y_i^v \\ z_i^v \end{bmatrix}.$$

Denote an overall SDR input vector S comprising all polynomial terms over all pixel values (indexed from 0 to K) at which SDR histogram bins are not empty as follows:

$$S = \begin{bmatrix} s_0^T \\ s_1^T \\ \vdots \\ s_{K-1}^T \end{bmatrix} \qquad (33)$$

Denote an overall HDR input vector Q as follows:

$$Q = \begin{bmatrix} q_0^T \\ q_1^T \\ \vdots \\ q_{K-1}^T \end{bmatrix} \qquad (34)$$

Expressions (31) and (32) can be rewritten in a matrix form as follows:

$$\hat{Q} = \begin{bmatrix} \hat{q}_0^T \\ \hat{q}_1^T \\ \vdots \\ \hat{q}_{K-1}^T \end{bmatrix} = SM_T \qquad (35)$$

The goal is then to find optimal values for the backward reshaping MMR matrix $M_T$ such that the following difference between $\hat{Q}$ and $Q$ as follows:

$$\underset{M_T}{\operatorname{argmin}} \|\hat{Q} - Q\|^2 = \underset{M_T}{\operatorname{argmin}} \|Q - SM_T\|^2 \qquad (36)$$

where $\hat{Q}$ represents predicted HDR codewords, and Q represents target HDR codewords derived from the set of target HDR images.

The (e.g., optimal, etc.) backward reshaping function $M_T$ can be obtained via the least squared solution as follows:

$$M_T = (S^T S)^{-1}(S^T Q) \qquad (37)$$

In some embodiments, an MMR-based backward reshaping mapping can be determined as a weighted least squared solution. For example, the weighted least squared solution can be obtained by incorporating $h^s(x^s, y^s, z^s)$ as weighting factors as follows:

$$M_T = (S^T W S)^{-1}(S^T W Q) \qquad (38)$$

where W represents a diagonal matrix (e.g., a K by K matrix, etc.) whose diagonal elements are populated by $h^s(x^s, y^s, z^s)$.

Example Process Flows

Figure 4A:
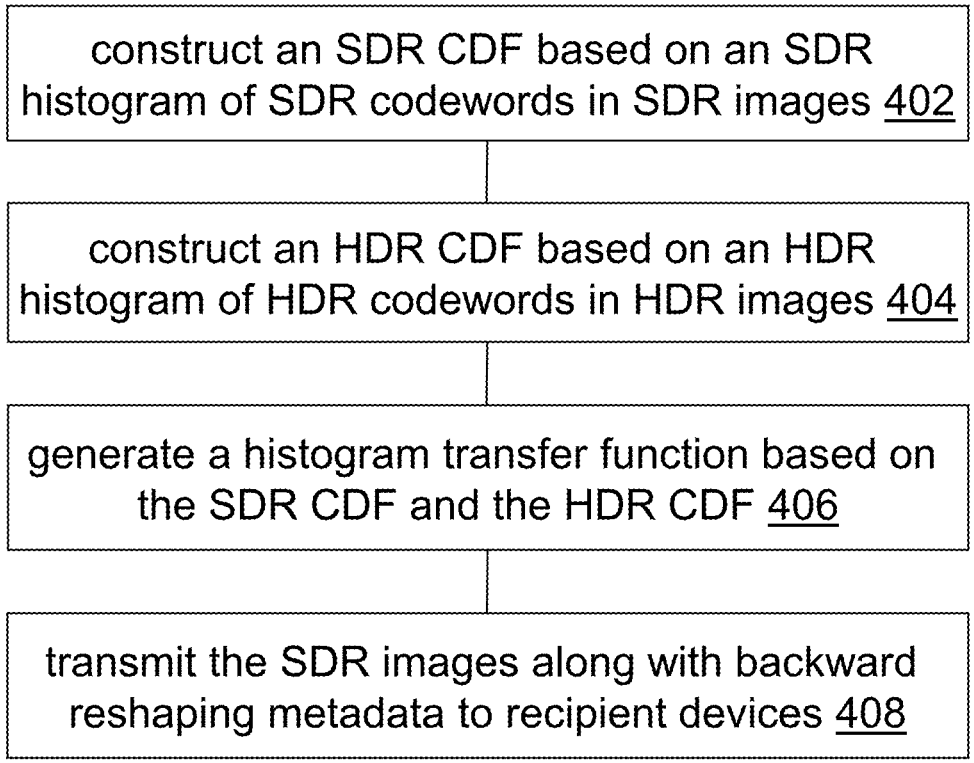

FIG. 4A illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 402, an image processing device (e.g., coding block (120), etc.) constructs a standard dynamic range (SDR) cumulative density function (CDF) based on an SDR histogram generated from a distribution of SDR codewords in one or more SDR images.

In block 404, the image processing device constructs a high dynamic range (HDR) CDF based on an HDR histogram generated from a distribution of HDR codewords in one or more HDR images that correspond to the one or more SDR images.

In block 406, the image processing device generates a histogram transfer function based on the SDR CDF and the HDR CDF.

In block 408, the image processing device transmits the one or more SDR images along with backward reshaping metadata to one or more recipient devices. The backward reshaping metadata is generated at least in part on the histogram transfer function.

In an embodiment, at least one of the SDR CDF and the HDR CDF represents a one-dimensional CDF over a single color component of a color space.

In an embodiment, each of the SDR CDF and the HDR CDF represents a multi-dimensional CDF over two or more color components of a color space; the image processing device is further configured to perform: constructing one or more marginal SDR CDFs by integrating the SDR CDF over one or more SDR color components of an SDR color space; constructing one or more marginal HDR CDFs by integrating the HDR CDF over one or more HDR color components of an HDR color space; performing one or more first searches with the one or more marginal SDR CDFs against the one or more marginal HDR CDFs, wherein each of the one or more first searches is a one-dimensional search for an optimal value of an HDR color component of an HDR codeword to which a given value of an SDR color component of an SDR codeword is to be mapped based on matching a CDF value of one of the one or more marginal SDR CDFs with a CDF value of a corresponding one of the one or more marginal HDR CDFs; performing a second further search with the SDR CDF against the HDR CDF based at least in part on results of the one or more first searches; etc.

In an embodiment, the second search is a one-dimensional search over a specific HDR color component other than the one or more HDR color components of the HDR color space.

In an embodiment, the second search is a multi-dimensional search over a multi-dimensional local area in the HDR color space; the multi-dimensional local area in the HDR color space is defined based on the results of the one or more first searches.

In an embodiment, the backward reshaping metadata comprises a first backward reshaping function represented by the histogram transfer function; the first backward reshaping function is used to backward reshape luma components of SDR codewords into luma components of predicted HDR codewords.

In an embodiment, the backward reshaping metadata further comprises a second backward reshaping function that is determined based on an MMR-based histogram approximation method; the second backward reshaping function is used to backward reshape chroma components of SDR codewords into one or more chroma components of predicted HDR codewords.

In an embodiment, the one or more target HDR images are derived from the one or more SDR images using an SDR-to-HDR conversion tool.

In an embodiment, the one or more target HDR images are generated from video data without performing any SDR-to-HDR conversion; the video data is also used to generate the one or more SDR images.

In an embodiment, the backward reshaping metadata comprising operational parameters specifying a set of polynomials that approximate the histogram transfer function.

In an embodiment, the backward reshaping metadata is carried in a video signal as a part of image metadata separate from the one or more SDR image.

In an embodiment, the video signal excludes the target HDR images or predicted HDR images approximating the target HDR images.

In an embodiment, the image processing device is further configured to perform color space conversion with one or both of the one or more SDR images or the one or more target HDR images.

In an embodiment, at least one of the one or more SDR images or the one or more target HDR images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, a standard dynamic range (SDR) color space, etc.

In an embodiment, the one or more SDR images are of a bit depth of one of 8, 9, 10, 11+ bits, etc.

In an embodiment, the one or more target HDR images are of a bit depth of one of 8, 9, 10, 11, 12, 13, 14, 15+ bits, etc.

In an embodiment, one or both of the one or more SDR images or the one or more target HDR images are created based a video professional's artistic intent.

Figure 4B:
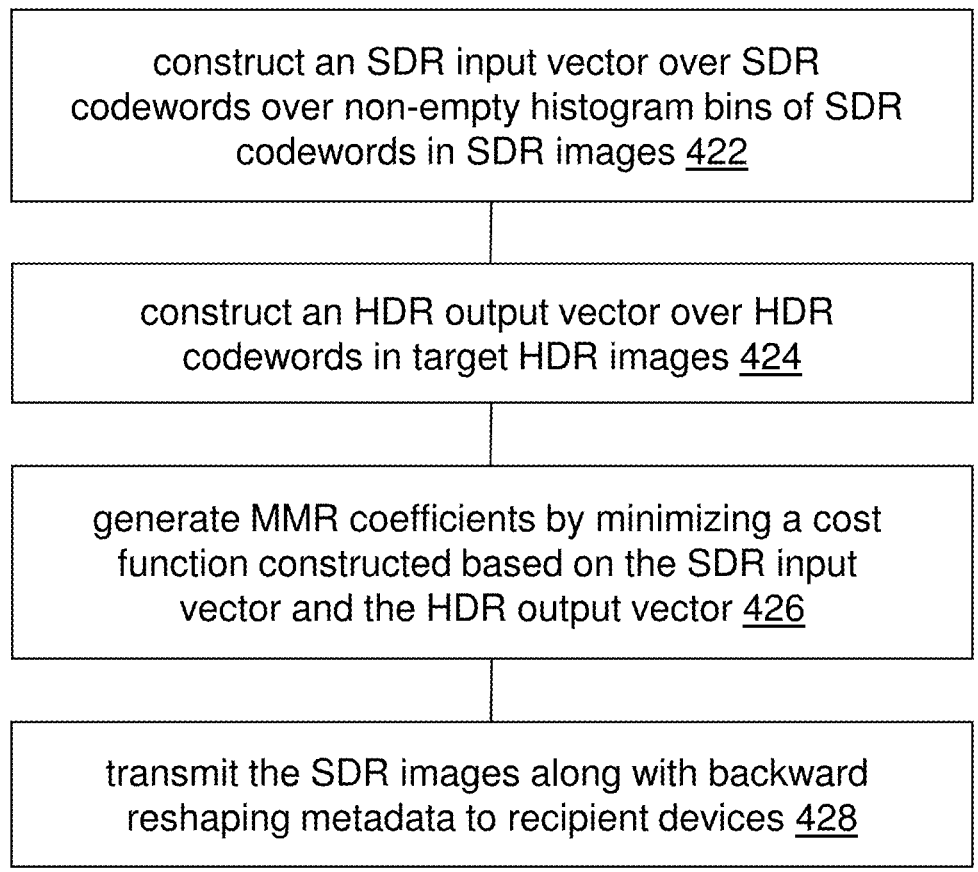

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 422, an image processing device (e.g., coding block (120), etc.) constructs an SDR input vector over SDR codewords corresponding to non-empty histogram bins of an SDR histogram generated from a distribution of SDR codewords in one or more SDR images.

In block 424, the image processing device constructs an HDR output vector over HDR codewords in one or more target HDR images that correspond to the one or more SDR images.

In block 426, the image processing device generates MMR coefficients by minimizing a cost function constructed based on the SDR input vector and the HDR output vector.

In block 428, the image processing device transmits the one or more SDR images along with backward reshaping metadata to one or more recipient devices. The backward reshaping metadata is generated at least in part on the MMR coefficients.

FIG. 4C illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 442, an image processing device (e.g., decoding block (130), etc.) constructs, based on backward reshaping metadata received with one or more standard dynamic range (SDR) images, a backward reshaping function.

The backward reshaping function is represented by a histogram transfer function generated based on an SDR cumulative density function (CDF) and a high dynamic range (HDR) CDF. The SDR CDF is constructed based on an SDR histogram generated from a distribution of SDR codewords in the one or more SDR images. The HDR CDF is constructed based on an HDR histogram generated from a distribution of HDR codewords in one or more target HDR images that correspond to the one or more SDR images.

In block 444, an image processing device applies the backward reshaping function to the one or more SDR images to generate one or more predicted HDR images that approximate the target HDR images.

In block 446, an image processing device causes the one or more predicted HDR images to be rendered with a display device.

In an embodiment, the backward reshaping metadata comprises a second backward reshaping function that is generated based on a multivariate multi-regression (MMR)-based histogram approximation method.

In an embodiment, the backward reshaping metadata is carried in a video signal as image metadata separate from the one or more forward reshaped image.

In an embodiment, the video signal excludes one or both of the one or more target HDR images or the one or more predicted HDR images.

In an embodiment, the image processing device is further configured to perform color space conversion on the one or more predicted HDR images.

In an embodiment, the one or more predicted HDR images are formatted in a different sampling format than that in which the one or more SDR images are formatted.

In an embodiment, at least one of the one or more predicted HDR images or the one or more SDR images are represented in one of: an IPT PQ (ICtCp) color space, an YCbCr color space, an RGB color space, a Rec. 2020 color space, a Rec. 709 color space, an extended dynamic range (EDR) color space, a gamma color space, an HLG color space, a PQ color space, a standard dynamic range (SDR) color space, etc.

In an embodiment, the one or more SDR images are of a bit depth of one of 8, 9, 10, 11+ bits, etc.

In an embodiment, the one or more predicted HDR images are of a bit depth of one of 8, 9, 10, 11, 12, 13, 14, 15+ bits, etc.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
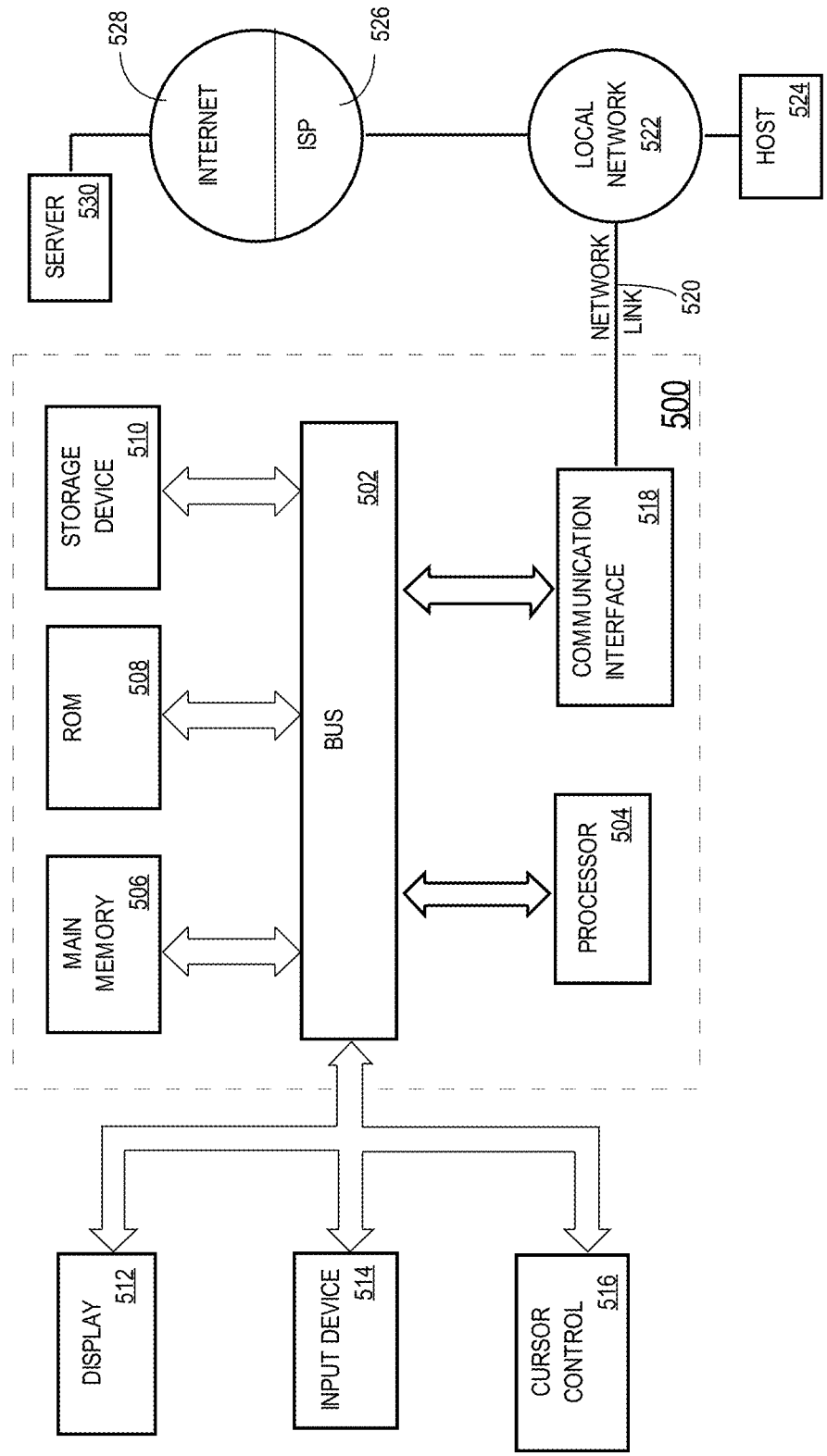
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method comprising:
constructing a standard dynamic range (SDR) cumulative density function (CDF) based on an SDR histogram generated from a distribution of SDR codewords in one or more SDR images;
constructing a high dynamic range (HDR) CDF based on an HDR histogram generated from a distribution of HDR codewords in one or more HDR images that correspond to the one or more SDR images;
generating a histogram transfer function based on the SDR CDF and the HDR CDF;
transmitting the one or more SDR images along with backward reshaping metadata to one or more recipient devices;
wherein the backward reshaping metadata is generated at least in part on the histogram transfer function.

EEE 2. The method of EEE 1, wherein at least one of the SDR CDF and the HDR CDF represents a one-dimensional CDF over a single color component of a color space.

EEE 3. The method of EEE 1, wherein each of the SDR CDF and the HDR CDF represents a multi-dimensional CDF over two or more color components of a color space; further comprising:
constructing one or more marginal SDR CDFs by integrating the SDR CDF over one or more SDR color components of an SDR color space;
constructing one or more marginal HDR CDFs by integrating the HDR CDF over one or more HDR color components of an HDR color space;
performing one or more first searches with the one or more marginal SDR CDFs against the one or more marginal HDR CDFs, wherein each of the one or more first searches is a one-dimensional search for an optimal value of an HDR color component of an HDR codeword to which a given value of an SDR color component of an SDR codeword is to be mapped based on matching a CDF value of one of the one or more marginal SDR CDFs with a CDF value of a corresponding one of the one or more marginal HDR CDFs;
performing a second further search with the SDR CDF against the HDR CDF based at least in part on results of the one or more first searches.

EEE 4. The method of EEE 3, wherein the second search is a one-dimensional search over a specific HDR color component other than the one or more HDR color components of the HDR color space.

EEE 5. The method of EEE 3, wherein the second search is a multi-dimensional search over a multi-dimensional local area in the HDR color space; and wherein the multi-dimensional local area in the HDR color space is defined based on the results of the one or more first searches.

EEE 6. The method of EEE 1, wherein the backward reshaping metadata comprises a first backward reshaping function represented by the histogram transfer function; and wherein the first backward reshaping function is used to backward reshape luma components of SDR codewords into luma components of predicted HDR codewords.

EEE 7. The method of EEE 6, wherein the backward reshaping metadata further comprises a second backward reshaping function that is determined based on an MMR-based histogram approximation method; and wherein the second backward reshaping function is used to backward reshape chroma components of SDR codewords into one or more chroma components of predicted HDR codewords.

EEE 8. The method of EEE 1, wherein the one or more target HDR images are derived from the one or more SDR images using an SDR-to-HDR conversion tool.

EEE 9. The method of EEE 1, wherein the one or more target HDR images are generated from video data without performing any SDR-to-HDR conversion; and wherein the video data is also used to generate the one or more SDR images.

EEE 10. The method of EEE 1, wherein the backward reshaping metadata comprising operational parameters specifying a set of polynomials that approximate the histogram transfer function.

EEE 11. The method of EEE 1, wherein the backward reshaping metadata is carried in a video signal as a part of image metadata separate from the one or more SDR image.

EEE 12. The method of EEE 1, wherein the video signal excludes the target HDR images or predicted HDR images approximating the target HDR images.

EEE 13. The method of EEE 1, further comprising performing color space conversion with one or both of the one or more SDR images or the one or more target HDR images.

EEE 14. The method of EEE 1, wherein at least one of the one or more SDR images or the one or more target HDR images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

EEE 15. The method of EEE 1, wherein the one or more SDR images are of a bit depth of one of 8, 9, 10, or 11+ bits.

EEE 16. The method of EEE 1, wherein the one or more target HDR images are of a bit depth of one of 8, 9, 10, 11, 12, 13, 14, or 15+ bits.

EEE 17. The method of EEE 1, wherein one or both of the one or more SDR images or the one or more target HDR images are created based on a video professional's artistic intent.

EEE 18. A method comprising:
constructing a standard dynamic range (SDR) input vector over SDR codewords corresponding to non-empty histogram bins of an SDR histogram generated from a distribution of SDR codewords in one or more SDR images;
constructing a high dynamic range (HDR) output vector over HDR codewords in one or more target HDR images that correspond to the one or more SDR images;
generating MMR coefficients by minimizing a cost function constructed based on the SDR input vector and the HDR output vector;
transmitting the one or more SDR images along with backward reshaping metadata to one or more recipient devices;
wherein the backward reshaping metadata is generated at least in part on the MMR coefficients.

EEE 19. A method comprising:
constructing, based on backward reshaping metadata received with one or more standard dynamic range (SDR) images, a backward reshaping function;
wherein the backward reshaping function is represented by a histogram transfer function generated based on an SDR cumulative density function (CDF) and a high dynamic range (HDR) CDF;
wherein the SDR CDF is constructed based on an SDR histogram generated from a distribution of SDR codewords in the one or more SDR images;
wherein the HDR CDF is constructed based on an HDR histogram generated from a distribution of HDR codewords in one or more target HDR images that correspond to the one or more SDR images;
applying the backward reshaping function to the one or more SDR images to generate one or more predicted HDR images that approximate the target HDR images;
causing the one or more predicted HDR images to be rendered with a display device.

EEE 20. The method of EEE 19, wherein the backward reshaping metadata comprises a second backward reshaping function that is generated based on a multivariate multi-regression (MMR)-based histogram approximation method.

EEE 21. The method of EEE 19, wherein the backward reshaping metadata is carried in a video signal as image metadata separate from the one or more forward reshaped image.

EEE 22. The method of EEE 21, wherein the video signal excludes one or both of the one or more target HDR images or the one or more predicted HDR images.

EEE 23. The method of EEE 19, further comprising performing color space conversion on the one or more predicted HDR images.

EEE 24. The method of EEE 19, wherein the one or more predicted HDR images are formatted in a different sampling format than that in which the one or more SDR images are formatted.

EEE 25. The method of EEE 19, wherein at least one of the one or more predicted HDR images or the one or more SDR images are represented in one of: an IPT PQ (ICtCp) color space, an YCbCr color space, an RGB color space, a Rec. 2020 color space, a Rec. 709 color space, an extended dynamic range (EDR) color space, a gamma color space, an HLG color space, a PQ color space, or a standard dynamic range (SDR) color space.

EEE 26. The method of EEE 19, wherein the one or more SDR images are of a bit depth of one of 8, 9, 10, or 11+ bits.

EEE 27. The method of EEE 19, wherein the one or more predicted HDR images are of a bit depth of one of 8, 9, 10, 11, 12, 13, 14, or 15+ bits.

EEE 28. A computer system configured to perform any one of the methods recited in EEEs 1-27.

EEE 29. An apparatus comprising a processor and configured to perform any one of the methods recited in EEEs 1-27.

EEE 30. A non-transitory computer-readable storage medium having stored thereon computer-executable instruction for executing a method in accordance with any of the EEEs 1-27.

The invention claimed is:

1. A method comprising:
constructing a standard dynamic range (SDR) cumulative density function (CDF) based on an SDR histogram generated from a distribution of SDR codewords in one or more SDR images;
constructing a high dynamic range (HDR) CDF based on an HDR histogram generated from a distribution of HDR codewords in one or more HDR images that correspond to the one or more SDR images;
generating a histogram transfer function based on the SDR CDF and the HDR CDF;
transmitting the one or more SDR images along with backward reshaping metadata to one or more recipient devices;
wherein the backward reshaping metadata is generated at least in part on the histogram transfer function.

2. The method of claim 1, wherein at least one of the SDR CDF and the HDR CDF represents a one-dimensional CDF over a single color component of a color space.

3. The method of claim 1, wherein each of the SDR CDF and the HDR CDF represents a multi-dimensional CDF over two or more color components of a color space; further comprising:
constructing one or more marginal SDR CDFs by integrating the SDR CDF over one or more SDR color components of an SDR color space;
constructing one or more marginal HDR CDFs by integrating the HDR CDF over one or more HDR color components of an HDR color space;
performing one or more first searches with the one or more marginal SDR CDFs against the one or more marginal HDR CDFs, wherein each of the one or more first searches is a one-dimensional search for an optimal value of an HDR color component of an HDR codeword to which a given value of an SDR color component of an SDR codeword is to be mapped based on matching a CDF value of one of the one or more marginal SDR CDFs with a CDF value of a corresponding one of the one or more marginal HDR CDFs.

4. The method of claim 3, further comprising performing a second further search with the SDR CDF against the HDR CDF based at least in part on results of the one or more first searches, wherein the second search is:
a one-dimensional search over a specific HDR color component other than the one or more HDR color components of the HDR color space; or
a multi-dimensional search over a multi-dimensional local area in the HDR color space; and wherein the multi-dimensional local area in the HDR color space is defined based on the results of the one or more first searches.

5. The method of claim 1, wherein the backward reshaping metadata comprises a first backward reshaping function represented by the histogram transfer function; and wherein the first backward reshaping function is used to backward reshape luma components of SDR codewords into luma components of predicted HDR codewords.

6. The method of claim 5, wherein the backward reshaping metadata further comprises a second backward reshaping function that is determined based on an MMR-based histogram approximation method; and wherein the second backward reshaping function is used to backward reshape chroma components of SDR codewords into one or more chroma components of predicted HDR codewords.

7. The method claim 1, wherein the one or more target HDR images are derived from the one or more SDR images using an SDR-to-HDR conversion tool.

8. The method of claim 1, wherein the one or more target HDR images are generated from video data without performing any SDR-to-HDR conversion; and wherein the video data is also used to generate the one or more SDR images.

9. The method of claim 1, wherein the backward reshaping metadata comprising operational parameters specifying a set of polynomials that approximate the histogram transfer function.

10. The method of claim 1, wherein the backward reshaping metadata is carried in a video signal as a part of image metadata separate from the one or more SDR image.

11. The method of claim 1, further comprising performing color space conversion with one or both of the one or more SDR images or the one or more target HDR images.

12. The method of claim 1, wherein the video signal excludes the target HDR images or predicted HDR images approximating the target HDR images.

13. The method of claim 1, wherein at least one of the one or more SDR images or the one or more target HDR images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

14. The method of claim 1, wherein the one or more SDR images are of a bit depth of one of 8, 9, 10, or 11+ bits.

15. The method of claim 1, wherein the one or more target HDR images are of a bit depth of one of 8, 9, 10, 11, 12, 13, 14, or 15+ bits.

16. An apparatus comprising a processor and configured to perform the method recited in claim 1.

17. A non-transitory computer-readable storage medium having stored thereon computer-executable instruction for executing a method with one or more processors in accordance with claim 1.

18. A method comprising:
constructing, based on backward reshaping metadata received with one or more standard dynamic range (SDR) images, a backward reshaping function;
wherein the backward reshaping function is represented by a histogram transfer function generated based on an SDR cumulative density function (CDF) and a high dynamic range (HDR) CDF;
wherein the SDR CDF is constructed based on an SDR histogram generated from a distribution of SDR codewords in the one or more SDR images;
wherein the HDR CDF is constructed based on an HDR histogram generated from a distribution of HDR codewords in one or more target HDR images that correspond to the one or more SDR images;
applying the backward reshaping function to the one or more SDR images to generate one or more predicted HDR images that approximate the target HDR images;
causing the one or more predicted HDR images to be rendered with a display device.

19. The method of claim 18, wherein the backward reshaping metadata comprises a second backward reshaping function that is generated based on a multivariate multi-regression (MMR)-based histogram approximation method.

20. A non-transitory computer-readable storage medium having stored thereon computer-executable instruction for executing a method with one or more processors in accordance with claim 18.

* * * * *